US 11,747,841 B2
United States Patent
Schaar et al.

(10) Patent No.: US 11,747,841 B2
(45) Date of Patent: Sep. 5, 2023

(54) CURRENT CONTROL APPARATUS

(71) Applicant: Eaton Intelligent Power Limited, Dublin (IE)

(72) Inventors: Jonathan Michael Schaar, Greenfield, WI (US); Tiefu Zhao, Huntersville, NC (US)

(73) Assignee: Eaton Intelligent Power Limited, Dublin (IE)

( * ) Notice: Subject to any disclaimer, the term of this patent is extended or adjusted under 35 U.S.C. 154(b) by 158 days.

(21) Appl. No.: 17/116,522

(22) Filed: Dec. 9, 2020

(65) Prior Publication Data
US 2021/0165433 A1 Jun. 3, 2021

Related U.S. Application Data

(63) Continuation of application No. 16/531,440, filed on Aug. 5, 2019, now Pat. No. 10,890,932.
(Continued)

(51) Int. Cl.
*G05F 1/20* (2006.01)
*H02J 3/18* (2006.01)
*H02J 4/00* (2006.01)

(52) U.S. Cl.
CPC .............. *G05F 1/20* (2013.01); *H02J 3/1878* (2013.01); *H02J 4/00* (2013.01)

(58) Field of Classification Search
CPC .. G05F 1/20; G05F 1/14; H02J 3/1878; H02J 4/00; H01H 9/0005; H01F 29/04; H02M 5/12; Y02E 40/30
See application file for complete search history.

(56) References Cited

U.S. PATENT DOCUMENTS 4,090,225 A 5/1978 Gilker et al.
5,166,597 A 11/1992 Larsen et al.
(Continued)

FOREIGN PATENT DOCUMENTS

CN 2527014 Y 12/2002
CN 2593463 Y 12/2003
(Continued)

OTHER PUBLICATIONS

VR-32 Voltage Regulator with Quik-Drive™ Tap-Changer, Installation, Operation, and Maintenance Instructions, MN225008EN, p. 15, Eaton Corporation, Feb. 2017.
(Continued)

*Primary Examiner* — Emily P Pham
(74) *Attorney, Agent, or Firm* — DiBerardino McGovern IP Group LLC

(57) ABSTRACT

An apparatus for a load tap changer includes a first primary winding electrically connected to a first contact, the first contact configured to connect to one of a plurality of taps in a load tap changer; a second contact, the second contact configured to connect to one of the plurality of taps in the load tap changer; a magnetic core; and a control circuit including: a secondary winding configured to magnetically couple to the first primary winding and the magnetic core; and an electrical network electrically connected to the secondary winding, the electrical network being configured to prevent magnetic saturation of the magnetic core during switching of the first or second contact.

24 Claims, 24 Drawing Sheets

Related U.S. Application Data

(60) Provisional application No. 62/719,974, filed on Aug. 20, 2018.

(56) References Cited

U.S. PATENT DOCUMENTS

| | | | |
|---|---|---|---|
| 5,604,424 A | 2/1997 | Shuttleworth | |
| 5,621,305 A | 4/1997 | Clark et al. | |
| 5,682,306 A | 10/1997 | Jansen | |
| 5,999,430 A | 12/1999 | Aritsuka | |
| 6,020,726 A | 2/2000 | James | |
| 6,144,191 A | 11/2000 | Raedy | |
| 6,218,744 B1 * | 4/2001 | Zahrte, Sr. | H02M 7/797 307/64 |
| 6,294,900 B1 | 9/2001 | Greenwood et al. | |
| 6,459,606 B1 | 10/2002 | Jadric | |
| 6,472,851 B2 | 10/2002 | Hammond | |
| 6,965,291 B2 | 11/2005 | Haugs et al. | |
| 7,064,966 B2 | 6/2006 | Yamada et al. | |
| 7,355,369 B2 | 4/2008 | Lavieville et al. | |
| 7,656,138 B2 | 2/2010 | Dohnal | |
| 7,855,906 B2 | 12/2010 | Klodowski et al. | |
| 8,013,555 B2 | 9/2011 | Thornell-Pers | |
| 8,207,716 B2 | 6/2012 | Raedy et al. | |
| 8,379,416 B1 | 2/2013 | Datta et al. | |
| 8,384,333 B2 | 2/2013 | Shimada | |
| 9,087,635 B2 | 7/2015 | Rosado et al. | |
| 9,263,961 B2 | 2/2016 | Jacobson et al. | |
| 9,304,522 B2 | 4/2016 | Divan et al. | |
| 9,450,410 B2 | 9/2016 | Moore et al. | |
| 9,557,754 B2 | 1/2017 | Panosyan et al. | |
| 9,570,252 B2 | 2/2017 | Wijekoon et al. | |
| 9,800,161 B2 | 10/2017 | Crane et al. | |
| 9,819,188 B1 | 11/2017 | Pan et al. | |
| 10,014,791 B2 * | 7/2018 | Bala | H01F 27/42 |
| 10,224,718 B2 | 3/2019 | Sun | |
| 2009/0230933 A1 | 9/2009 | Oates et al. | |
| 2010/0201338 A1 * | 8/2010 | Haj-Maharsi | H02M 5/10 323/305 |
| 2011/0057517 A1 | 3/2011 | Zhang | |
| 2011/0304141 A1 | 12/2011 | Van Dyck et al. | |
| 2013/0308361 A1 | 11/2013 | Steigerwald et al. | |
| 2014/0009980 A1 | 1/2014 | Divan et al. | |
| 2016/0359326 A1 * | 12/2016 | Sun | H02J 3/10 |
| 2017/0154738 A1 | 6/2017 | Baeuml et al. | |
| 2017/0250540 A1 | 8/2017 | Varma | |
| 2017/0344039 A1 | 11/2017 | Stich et al. | |
| 2018/0024583 A1 | 1/2018 | Haensgen et al. | |
| 2018/0173257 A1 | 6/2018 | Dauzat | |

FOREIGN PATENT DOCUMENTS

| | | |
|---|---|---|
| CN | 1641809 A | 7/2005 |
| CN | 2896468 Y | 5/2007 |
| CN | 200956303 Y | 10/2007 |
| CN | 201035439 Y | 3/2008 |
| CN | 101325124 A | 12/2008 |
| CN | 201466724 U | 5/2010 |
| CN | 101728830 A | 6/2010 |
| CN | 101860229 A | 10/2010 |
| CN | 101938130 A | 1/2011 |
| CN | 102035212 A | 4/2011 |
| CN | 201821315 U | 5/2011 |
| CN | 201846299 U | 5/2011 |
| CN | 202373982 U | 8/2012 |
| CN | 103019284 A | 4/2013 |
| CN | 203278226 U | 11/2013 |
| CN | 103762598 A | 4/2014 |
| CN | 203632254 U | 6/2014 |
| CN | 104007780 A | 8/2014 |
| CN | 104009485 A | 8/2014 |
| CN | 203858969 U | 10/2014 |
| CN | 203967987 U | 11/2014 |
| CN | 204068719 U | 12/2014 |
| CN | 104362644 A | 2/2015 |
| CN | 204190625 U | 3/2015 |
| CN | 204205599 U | 3/2015 |
| CN | 105119262 A | 12/2015 |
| CN | 204857421 U | 12/2015 |
| CN | 105529911 A | 4/2016 |
| CN | 108037346 A | 5/2018 |
| DE | 742091 C | 5/1953 |
| ES | 1112180 U | 6/2014 |
| GB | 2424766 B | 6/2007 |
| JP | H11164559 A | 6/1999 |
| JP | 2001169539 A | 6/2001 |
| JP | 2002091578 A | 3/2002 |
| JP | 4872090 B2 | 9/2014 |
| JP | 2014176270 A | 9/2014 |
| JP | 6259202 B2 | 1/2018 |
| RU | 2308779 C2 | 10/2007 |
| RU | 2564990 C2 | 10/2015 |
| WO | 2015025133 A1 | 2/2015 |
| WO | 2017205616 A1 | 11/2017 |

OTHER PUBLICATIONS

Product description, VACUTAP® RMV-II, 2159612/02 EN, pp. 16-18, Maschinenfabrik Reinhausen GmbH, 2004.

Connection Diagrams, JFR Distribution Step Voltage Regulator Installation—Operation—Maintenance Instructions, 21-115532-001 PR4018-6, pp. 6-7, Siemens Energy, Inc., Oct. 2008.

Alexandra Voyé, European International Searching Authority, Invitation to Pay Fees with Partial international Search Report and Provisional Written Opinion, counterpart PCT Application No. PCT/EP2019/025271 dated Nov. 14, 2019, 11 pages total.

Valeri Pavlov, European International Searching Authority, International Search Report and Written Opinion, counterpart PCT Application No. PCT/EP2019/025271 dated Jan. 15, 2020, 17 pages total.

Valeri Pavlov, European Examiner, Communication pursuant to Article 94(3) EPC, counterpart EP Application No. 19762085.9 dated May 3, 2023, 10 pages total.

* cited by examiner

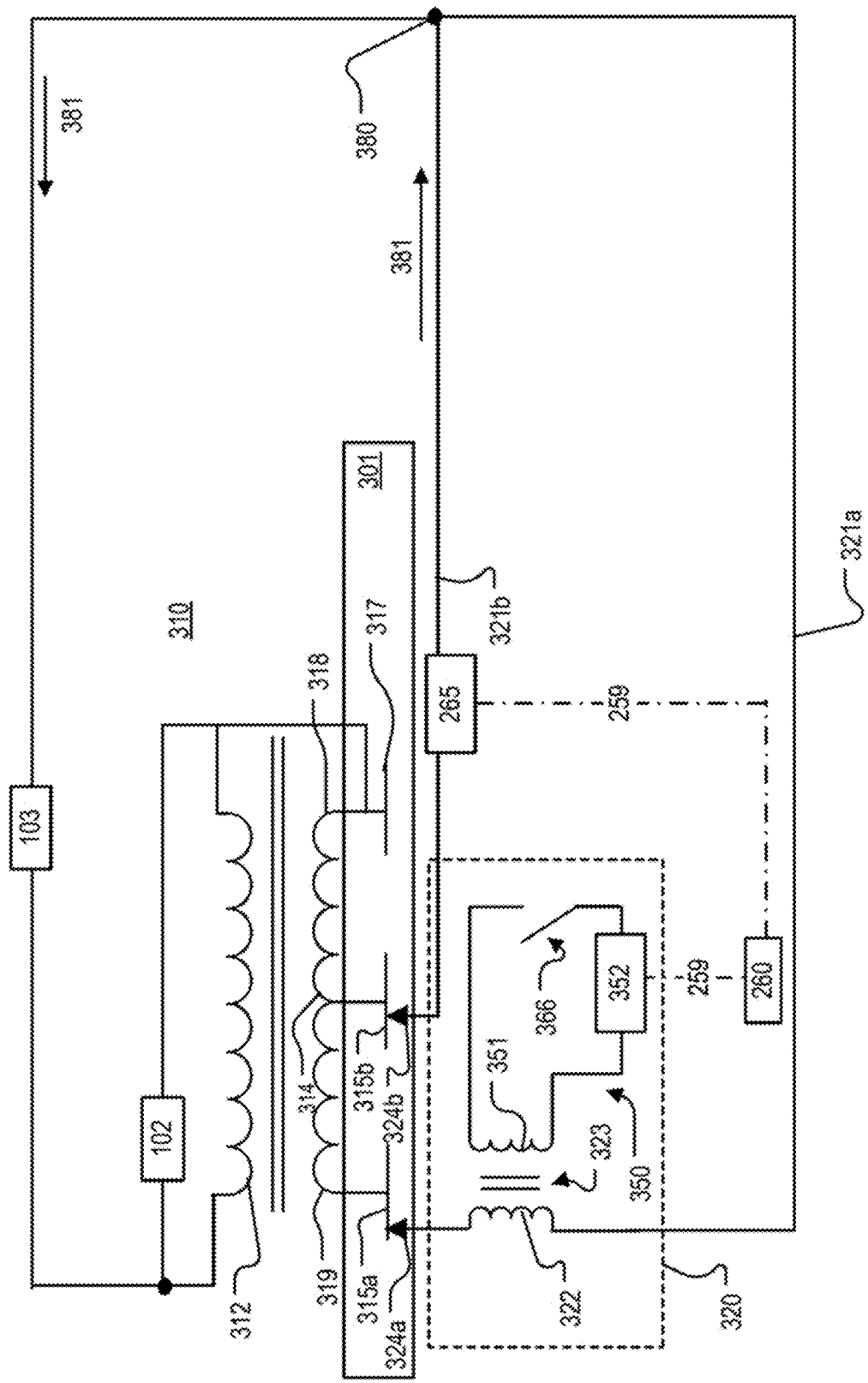

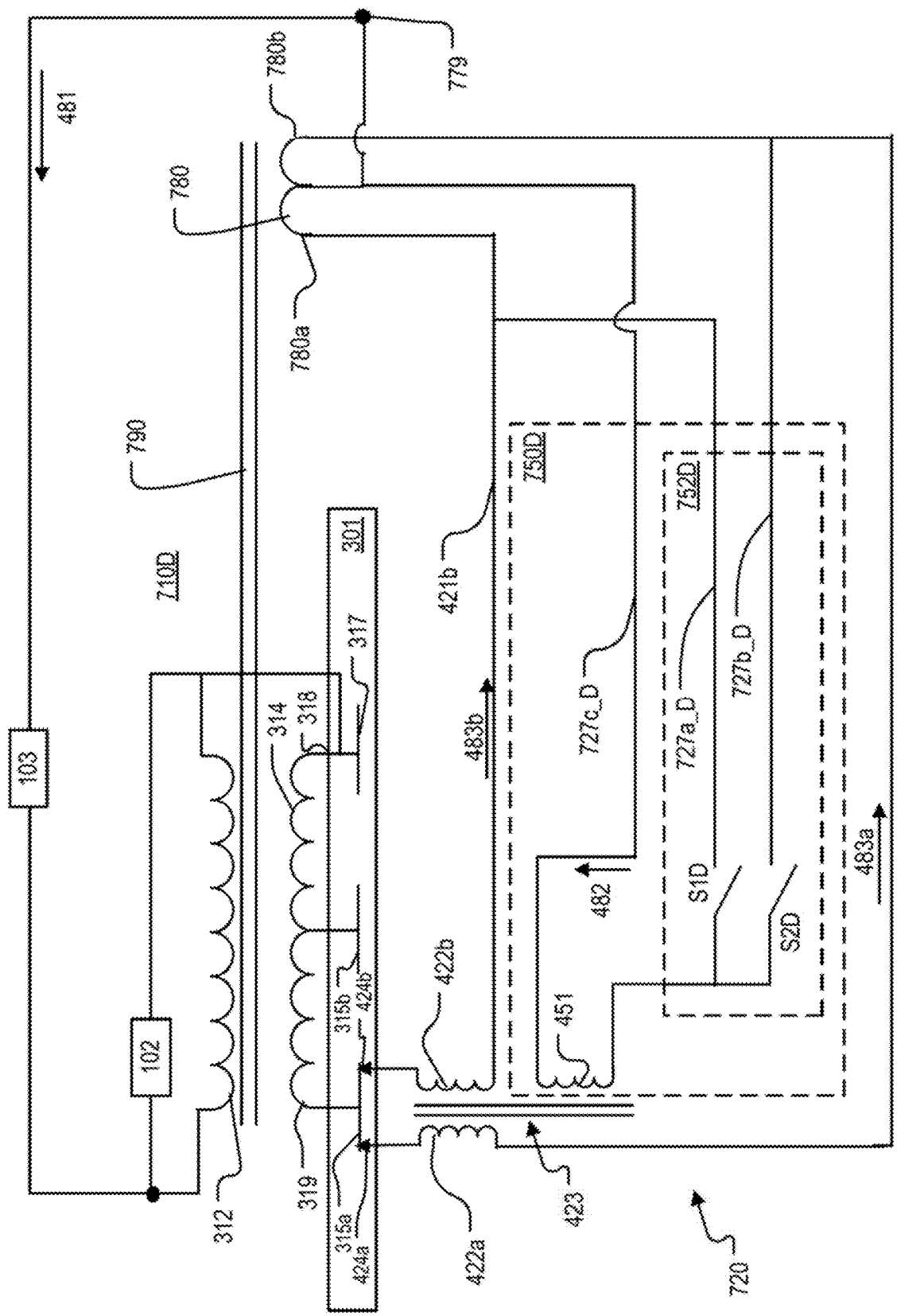

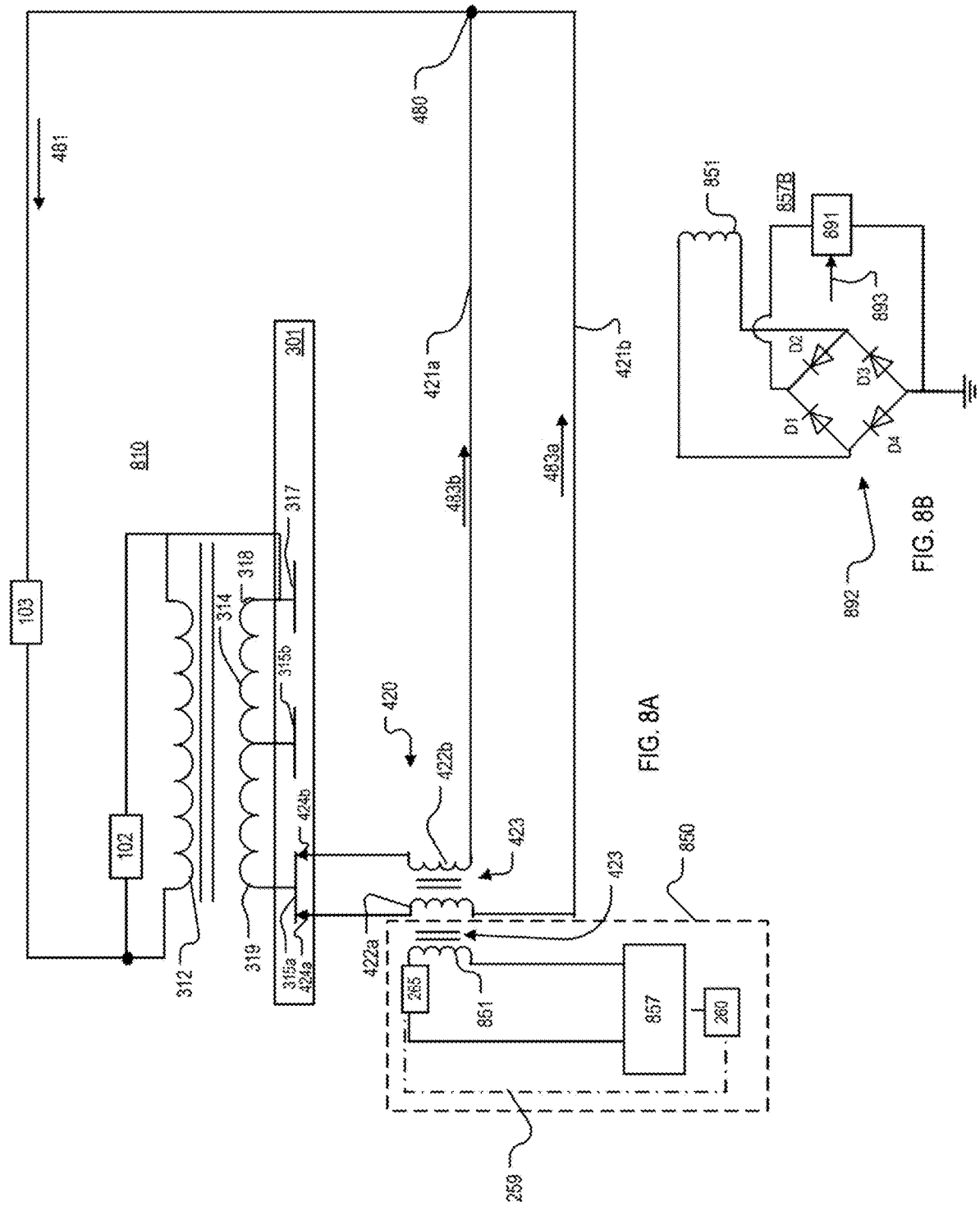

CURRENT CONTROL APPARATUS

CROSS-REFERENCE TO RELATED APPLICATION

This application is a continuation of U.S. patent application Ser. No. 16/531,440, filed Aug. 5, 2019 and titled CURRENT CONTROL APPARATUS, which claims the benefit of U.S. Provisional Application No. 62/719,974, filed on Aug. 20, 2018 and titled CURRENT CONTROL APPARATUS, both of which are incorporated herein by reference in their entirety.

TECHNICAL FIELD

This disclosure relates to a current control apparatus. The current control apparatus may be used to control current in a winding of a device used for voltage regulation.

BACKGROUND

Voltage regulators are used to monitor and control a voltage level in an electrical power distribution network. A voltage regulator includes a main winding and an electromagnetic circuit that delivers current from the main winding to an electric load. The electromagnetic circuit includes electrical contacts, and the main winding includes a plurality of taps. The output voltage of the voltage regulator is determined by which of the plurality of taps are in contact with the electrical contacts.

SUMMARY

In one general aspect, an apparatus for a load tap changer includes a first primary winding electrically connected to a first contact, the first contact configured to connect to one of a plurality of taps in a load tap changer; a second contact, the second contact configured to connect to one of the plurality of taps in the load tap changer; a magnetic core; and a control circuit including: a secondary winding configured to magnetically couple to the first primary winding and the magnetic core; and an electrical network electrically connected to the secondary winding, the electrical network being configured to prevent magnetic saturation of the magnetic core during switching of the first or second contact.

Implementations may include one or more of the following features. The electrical network may prevent magnetic saturation of the magnetic core by reducing the absolute value of magnetic flux in the magnetic core. The absolute value of magnetic flux in the magnetic core may be reduced by allowing the flow of electrical current in the secondary winding. The electrical network may be powered by an alternating current (AC) power source. The AC power source may include a third winding that is electrically connected to the first primary winding.

The electrical network may prevent magnetic saturation of the magnetic core by increasing or decreasing electrical current in the secondary winding to increase or decrease the magnetic flux in the magnetic core. The electrical network may include a direct current (DC) bus, and electrical power to increase or decrease electrical current in the secondary winding is provided by the direct current (DC) bus. The direct current (DC) bus also may be coupled to an alternating current (AC) power system to compensate reactive power. The alternating current (AC) power system may be a multi-phase system. The electrical network may include a power source, and the power source may be controllable to increase or decrease electrical current in the secondary winding. The power source may be powered from a voltage transformer. The power source may be powered from a current transformer. The increase or decrease of magnetic flux in the magnetic core may cause a circulating current to flow in a short circuit, the short circuit being formed by the first contact, the second contact, and the primary winding. The circulating current may be equal in amplitude and opposite in phase to a load current carried by the first contact or the second contact. The load tap changer may receive power from an alternating current (AC) power distribution network that operates at a system frequency, and causing the circulating current to flow in the short circuit may result in the net current through the first contact or the second contact being equal to zero more frequently than the system frequency. Causing the circulating current to flow in the short circuit may reduce the root-mean-square of the net current through the first contact or the second contact.

In some implementations, the apparatus for the load tap changer also includes: a second primary winding connected to the second contact; a second magnetic core; and a second secondary winding magnetically coupled to the second magnetic core and second primary winding. In these implementations, the electrical network is also connected to the second secondary winding and configured to control the current in the first secondary winding and second secondary winding. Further, the electrical network may control the current in the first primary winding and the second primary winding by controlling the current in the first secondary winding and the second secondary winding. The current through the first contact may be zero while switching taps. The output voltage to a connected load may be controlled by an electrical network connected to the first primary winding and the second primary winding.

In another general aspect, an apparatus for controlling voltage output of a transformer includes a first current path including a first primary winding electrically connected to a winding tap; a second current path including a second primary winding electrically connected to a winding tap; and an electrical network magnetically coupled to the first primary winding and second primary winding, the electrical network being configured to control current in the first and the second primary windings.

Implementations may include one or more of the following features. The transformer may be a multi-phase transformer. The electrical network may include a first switch; a second switch; and a bypass switch connected between the first switch and the second switch. A direct current (DC) bus may be coupled to the transformer to compensate reactive power from the alternating current (AC) power system.

Implementations of any of the techniques described herein may include a voltage regulator, a load tap changer, an apparatus, a current control apparatus, a kit for retrofitting an existing voltage regulator with a current control apparatus, a controller for controlling a voltage regulator, or a process. The details of one or more implementations are set forth in the accompanying drawings and the description below. Other features will be apparent from the description and drawings, and from the claims.

DRAWING DESCRIPTION

FIGS. 3A-3E are block diagrams of another example of a voltage regulator.

FIG. 7D is a block diagram of another example of a voltage regulator.

FIG. 8A is a block diagram of another example of a voltage regulator.

FIG. 8B is a block diagram of an another example of an electrical network.

Figure 10A:
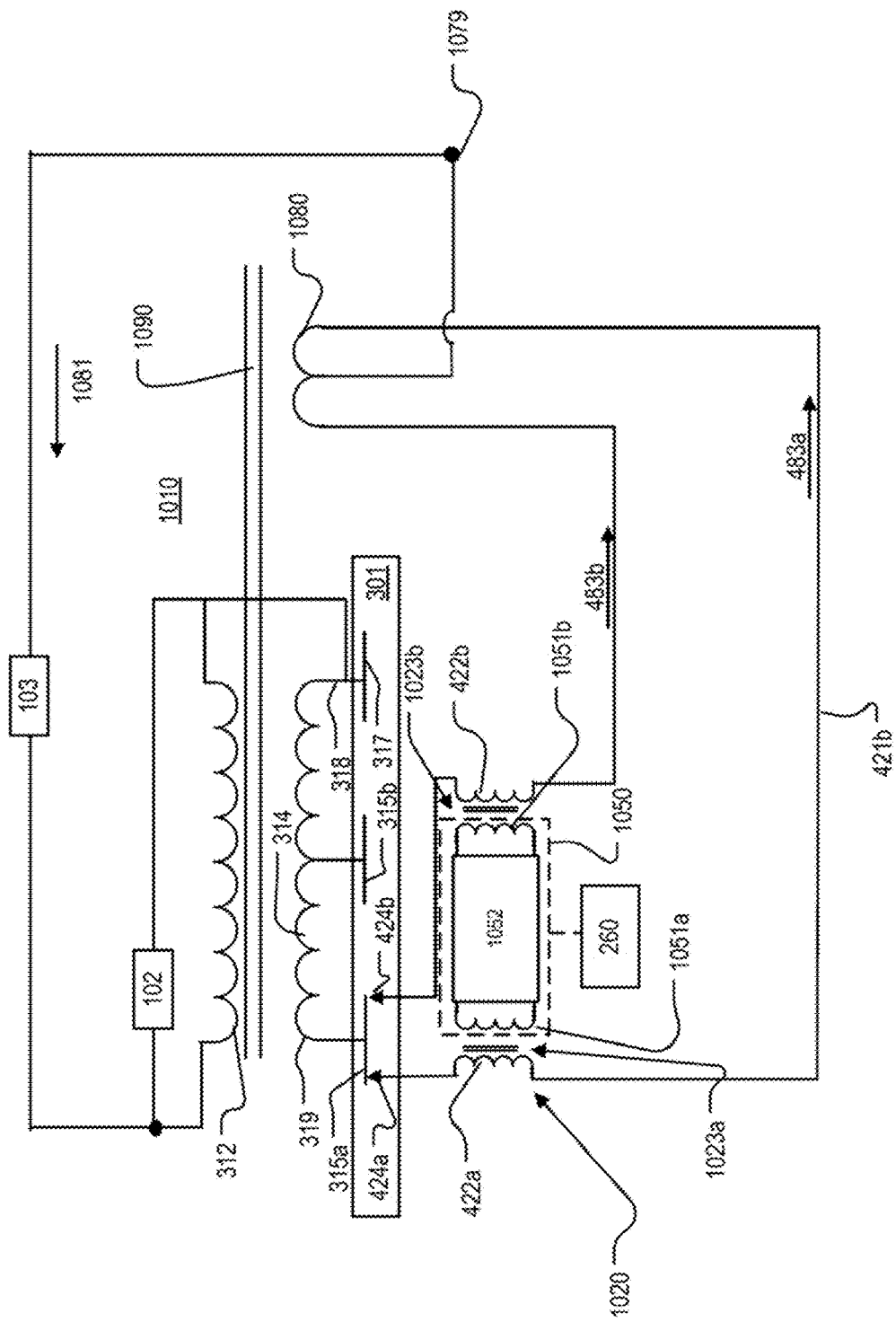
Figure 10B:
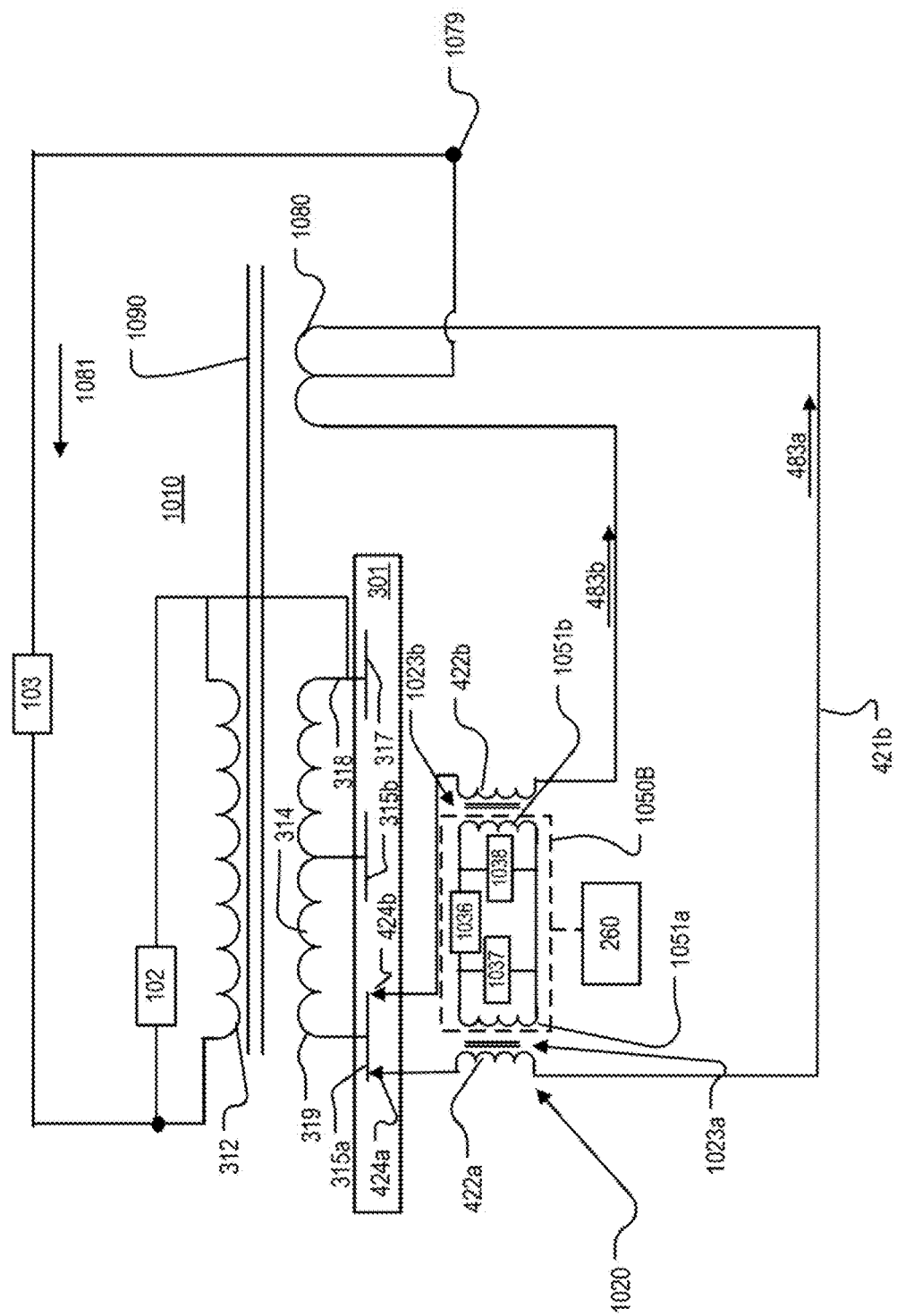
Figure 10C:
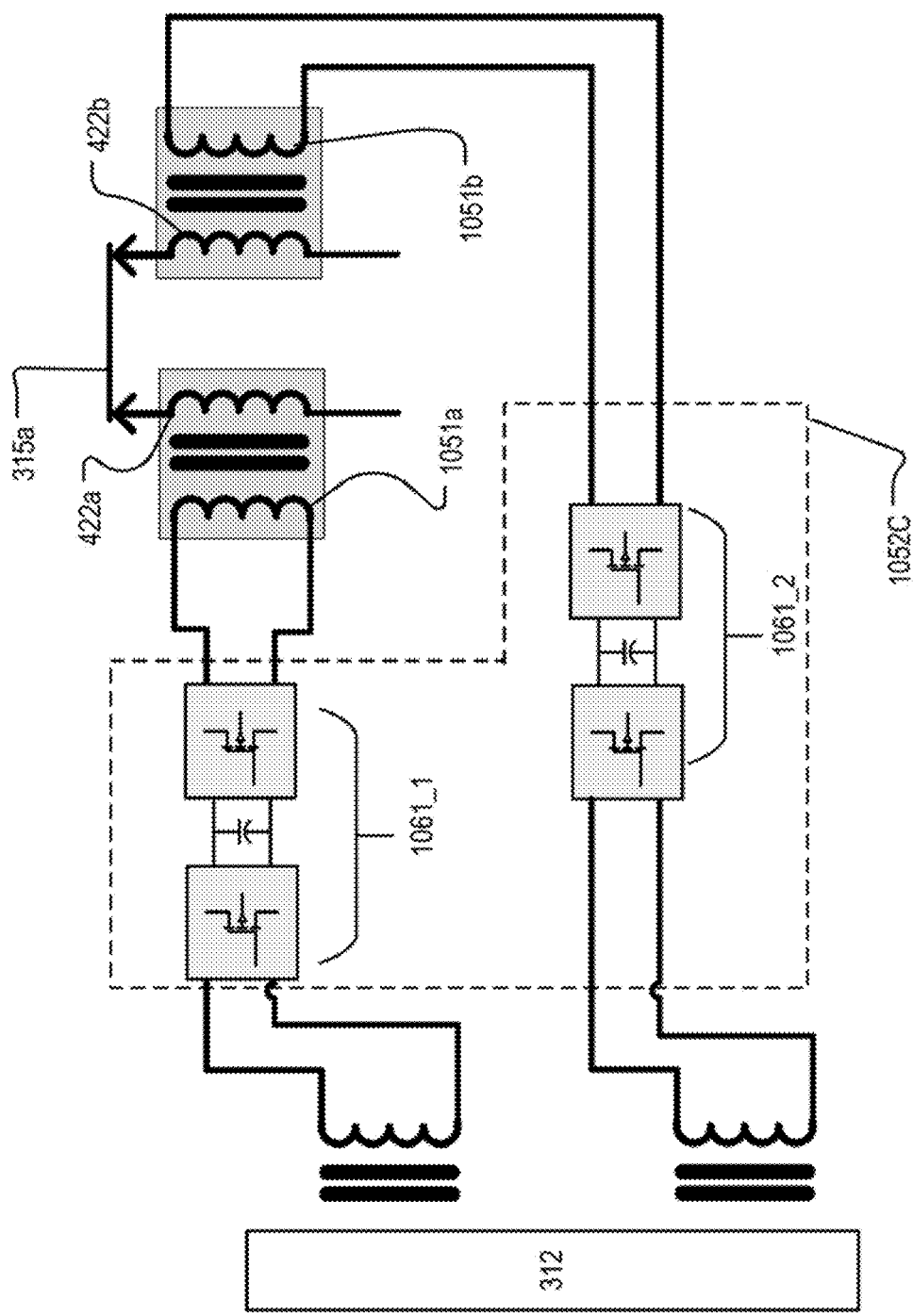
Figure 10D:
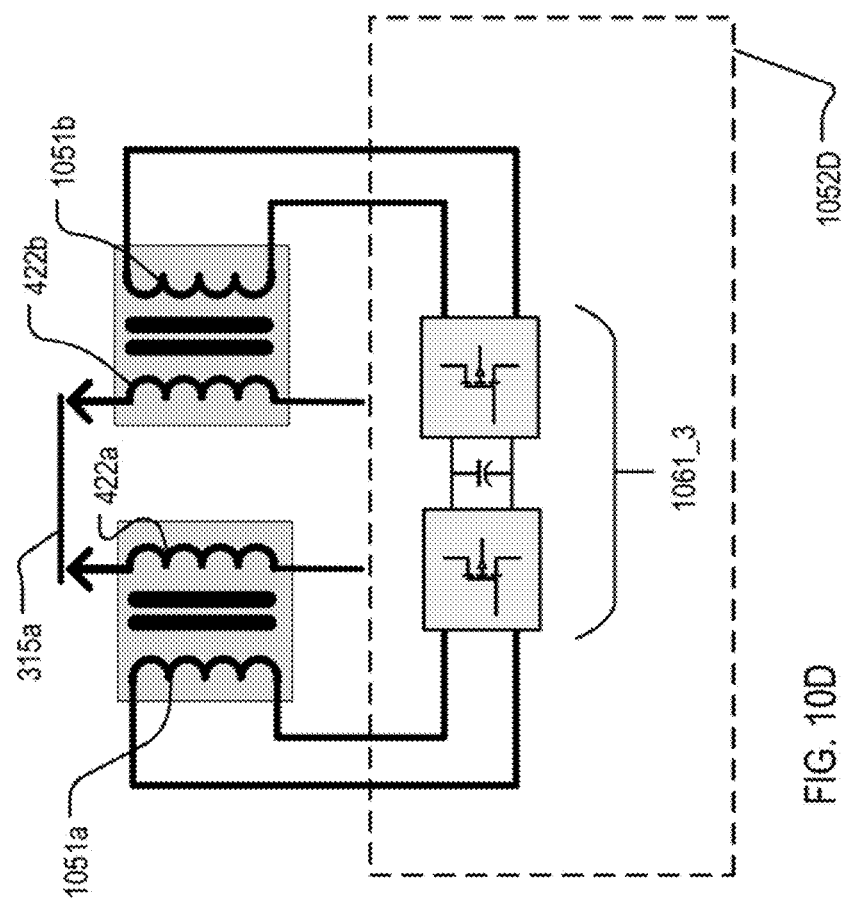
Figure 10E:
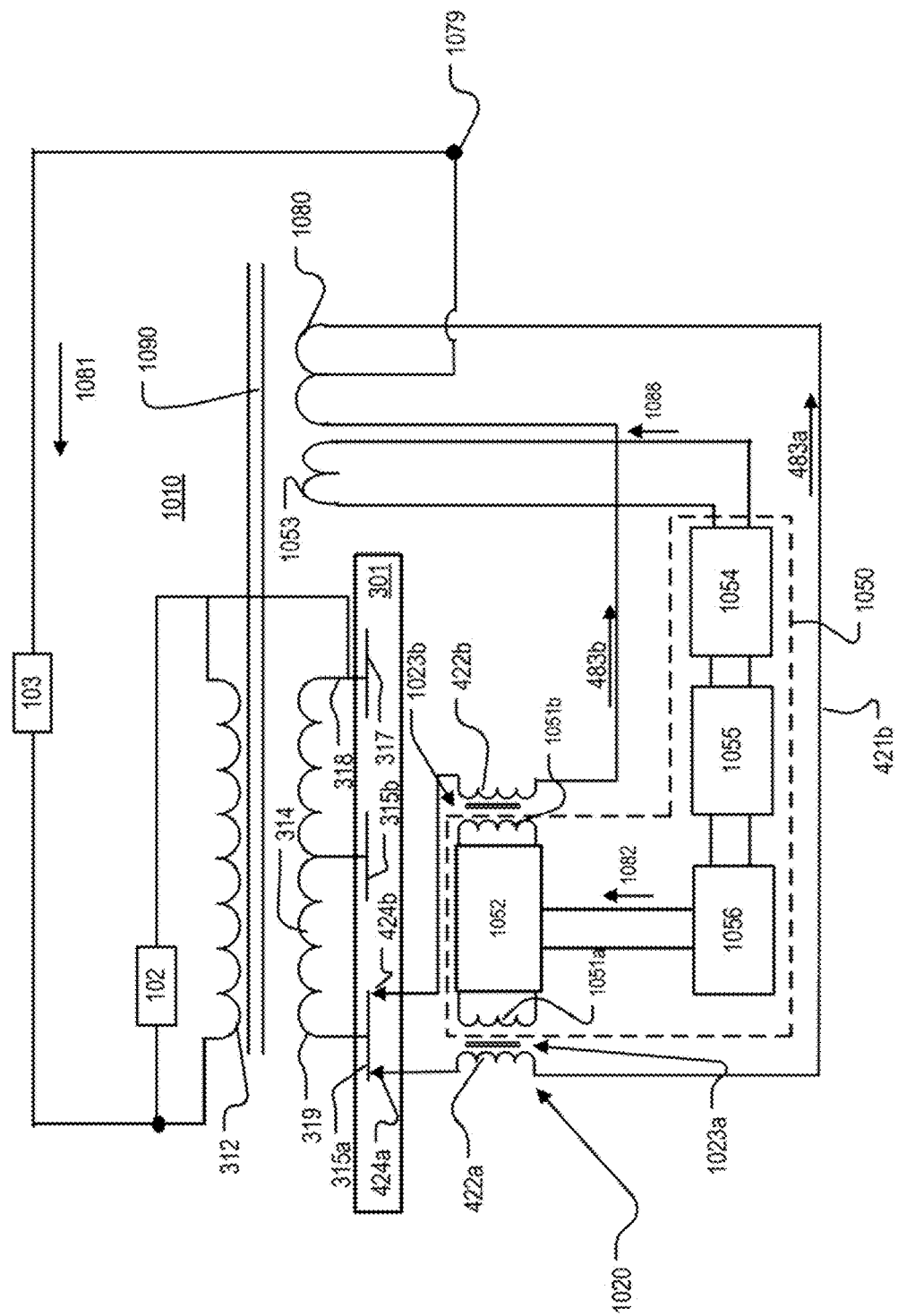

FIGS. 10A, 10B, and 10E are block diagrams of other examples of a voltage regulator.

FIGS. 10C and 10D are block diagrams of examples of electrical networks.

Figure 11:
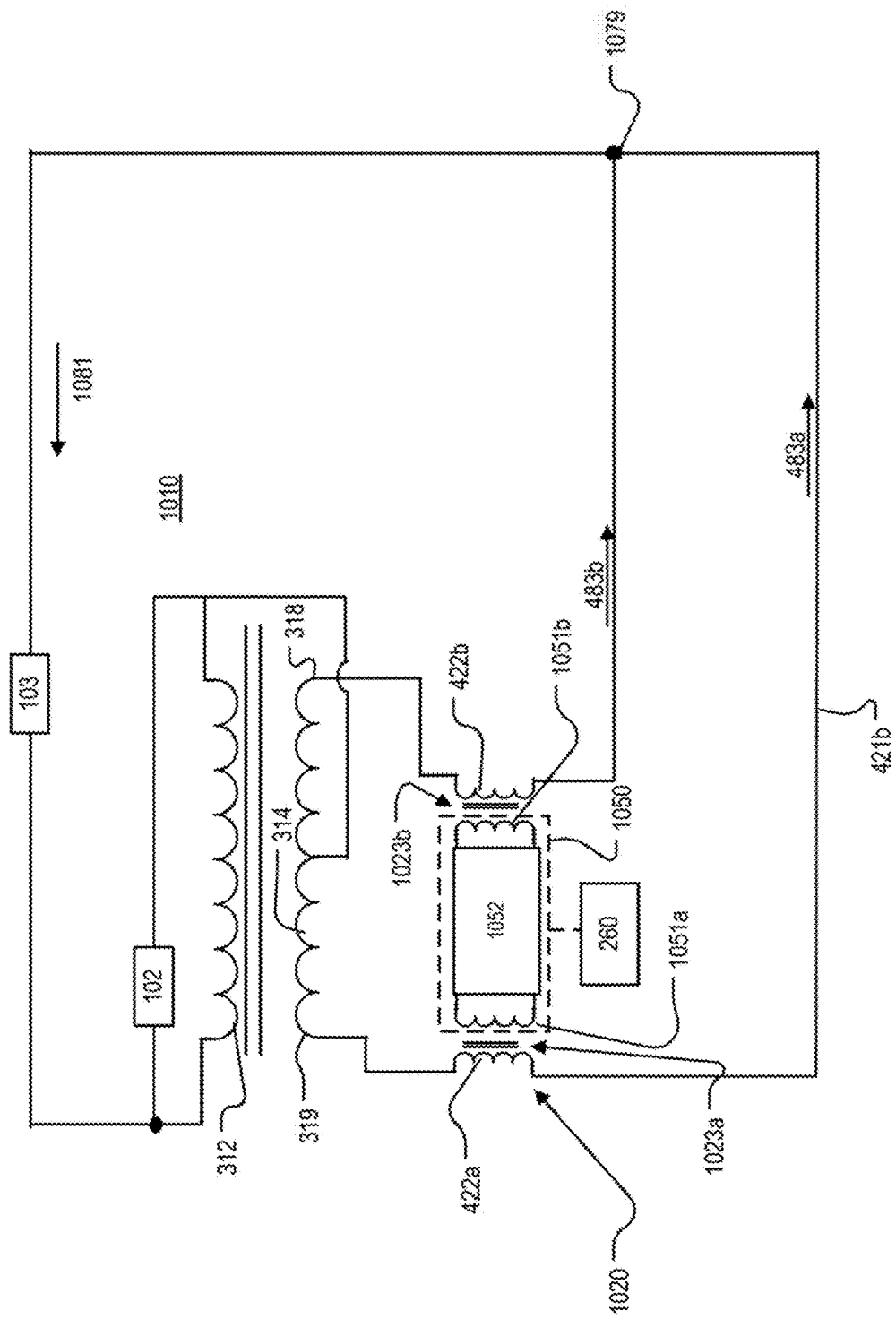
Figure 12:
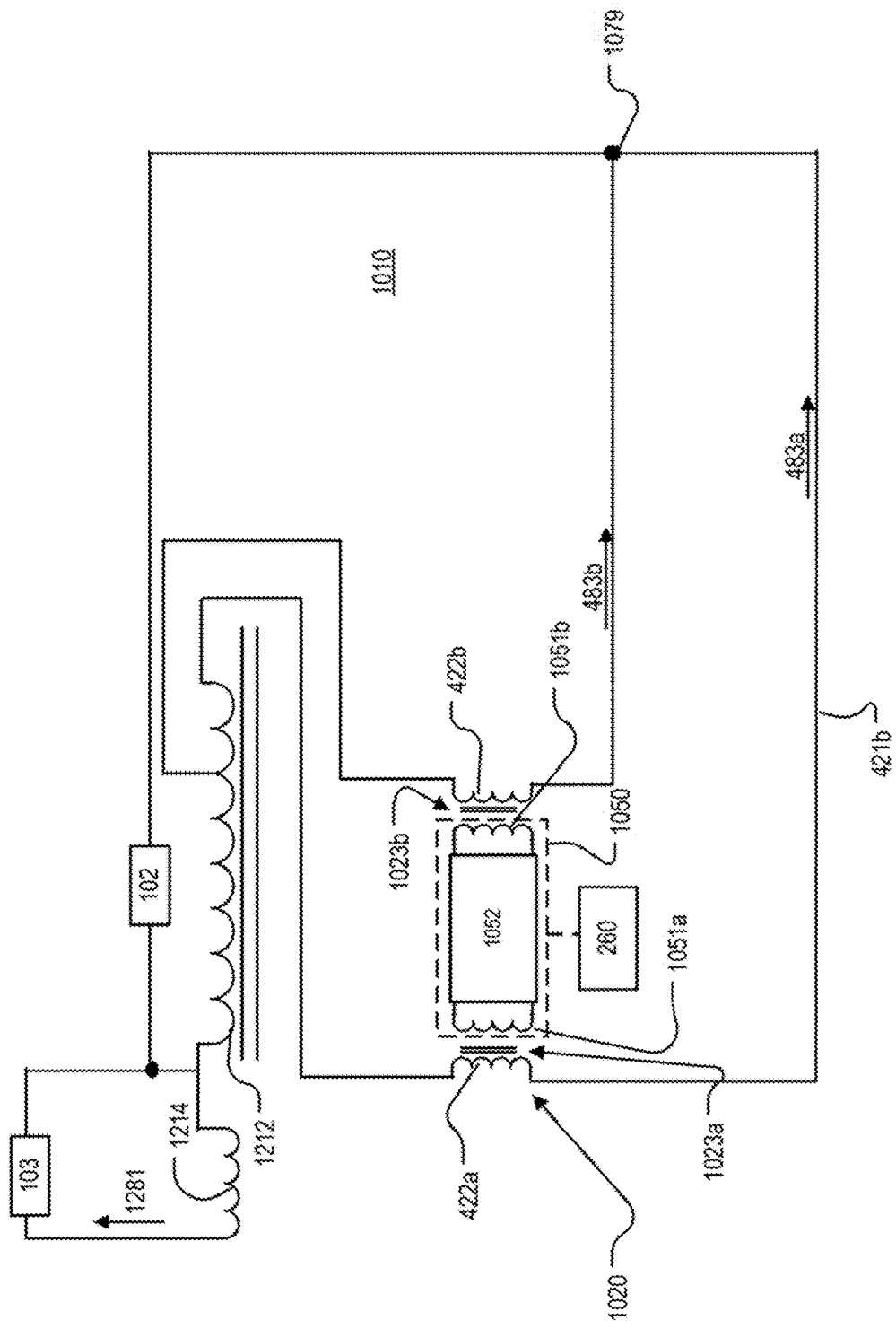

FIGS. 11 and 12 are block diagram of other examples of a current control apparatus.

DETAILED DESCRIPTION

Figure 1:
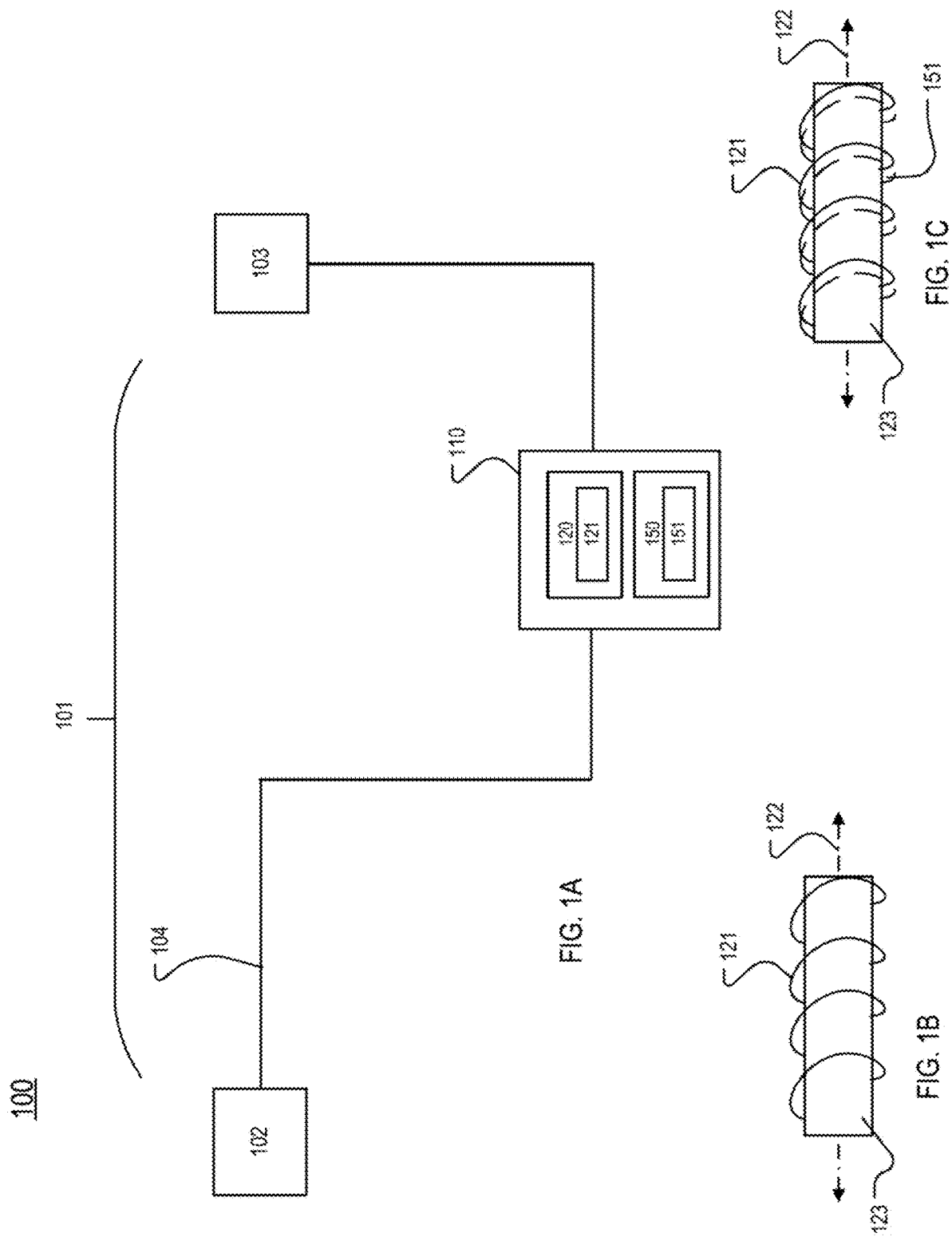
FIG. 1A is a block diagram of an example of an alternating-current (AC) electrical power system.
FIGS. 1B and 1C are block diagrams of an example of a core.

FIG. 1A is a block diagram of an example of an alternating-current (AC) electrical power system 100. The electrical power system 100 includes an electrical power distribution network 101 that transfers electricity from a power source 102 to electrical loads 103 through a distribution path 104 and an electrical apparatus 110. The electrical apparatus 110 is any apparatus that is capable of regulating the voltage to the loads 103. For example, the electrical apparatus 110 may be a voltage regulator that includes a load tap changer. The electrical power distribution network 101 may be, for example, an electrical grid, an electrical system, or a multiphase electrical network that provides electricity to commercial and/or residential customers. The electrical power distribution network 101 may have an operating voltage of, for example, at least 1 kilovolt (kV), 12 kV, up to 34.5 kV, up to 38 kV, or 69 kV or higher, and may operate at a system frequency of, for example, 50-60 Hertz (Hz). The distribution path 104 may include, for example, one or more transmission lines, electrical cables, and/or any other mechanism for transmitting electricity.

The electrical apparatus 110 includes an electromagnetic circuit 120 and a current control circuit 150, which controls a current in the electromagnetic circuit 120. The electromagnetic circuit 120 includes a winding 121. The winding 121 is an electrical conductor. For example, the winding 121 may be a cable or wire made of an electrically conductive material, such as a metal. Referring also to FIG. 1B, the winding 121 is wrapped in, for example, a coil or helical shape having a central region 122.

In the example shown in FIG. 1B, the winding 121 is wrapped around a magnetic core 123 that is in the central region 122. The magnetic core 123 is made of a ferromagnetic material, such as, for example, iron or steel. In the example of FIG. 1B, the magnetic core is shown as a rod. However, the magnetic core 123 may have any shape. For example, the magnetic core 123 may be a ring, a square or rectangular shaped annulus, or any other structure that has a ferromagnetic region suitable for attaching a winding. The magnetic core 123 may be a gapped core or an un-gapped core. In implementations in which the core 123 is an un-gapped core, the core 123 is a contiguous segment of ferromagnetic material. A gapped core includes a gap that is not ferromagnetic material. The gap may be, for example, air, nylon, or any other material that is not ferromagnetic. Thus, in implementations in which the core 123 is a gapped core, the core includes at least one segment of a ferromagnetic material and at least one segment of a material that is not a ferromagnetic material. In implementations in which the core has more than one segment of ferromagnetic material, the segments are separated from each other with a material that is not a ferromagnetic material. The regions of non-ferromagnetic material between the segments of ferromagnetic material are referred to as gaps.

The current control circuit 150 controls the current in the electromagnetic circuit 120 by controlling an amount of magnetic flux in the magnetic core 123. Magnetic flux is a measure of the total magnetic field that passes through a surface and is defined as is the surface integral of the normal component of a magnetic field that passes through a surface in units of weber (Wb). The relationship between current, voltage, and magnetic flux in an electromagnetic circuit given various open-circuit and closed-circuit conditions is fundamental to the operation of the current control circuit 150. For example, the magnetic field generated by a current that is carried in a wire is given by:

$$B = \frac{\mu_0 I}{2\pi r},$$ Equation (1)

where B is the magnitude of the magnetic field in Teslas (T), $\mu_0$ is the permeability of free space, I is the magnitude of the current that is carried in the wire, and r is the distance from the wire in meters (m). The magnetic field in a material that is not free space (such as the core 123) is related to B by the permeability of the material. As noted above, the magnetic flux depends on the magnetic field. Thus, the amount of magnetic flux in the core 123 may be controlled by controlling the amount of current in the winding 121 or by controlling the amount of current in a winding 151, which is also wrapped around the core 123.

The current control circuit 150 includes the winding 151, which is an electrical conductor (for example, a metal wire). Referring also to FIG. 1C, the winding 151 (shown as a dashed line to visually distinguish the winding 151 from the winding 121) is also wrapped around the magnetic core 123. The winding 151 and the winding 121 are electrically isolated from each other but are magnetically coupled via the magnetic core 123. In a system in which a first coil or winding and a second coil or winding share a common magnetic core, a time-varying electrical current in the first winding generates a time-varying magnetic field in the common core, and the generated time-varying magnetic field induces a corresponding time-varying current in the second winding, and vice versa. Thus, a time-varying current in the winding 151 generates a corresponding time-varying current in the winding 121 of the electromagnetic circuit 120. Using contemporary power electronic principles, the current control circuit 150 can act as a source or an impedance connected to winding 151 to cause or prevent the flow of current in winding 121. For example, the current control circuit 150 may be used to cause the current in the winding 121 to decrease or drop to zero prior to separating a contact connected to the winding 121 from a tap. Moreover, the control circuit 150 may be used to control an amount of magnetic flux in the magnetic core 123 during a switching operation to thereby prevent or minimize the likelihood of saturation. Various implementations of the current control circuit 150 are discussed below. Prior to discussing the various implementations of the current control circuit 150, an overview of a voltage regulator that includes a load tap changer is provided.

Figure 2:
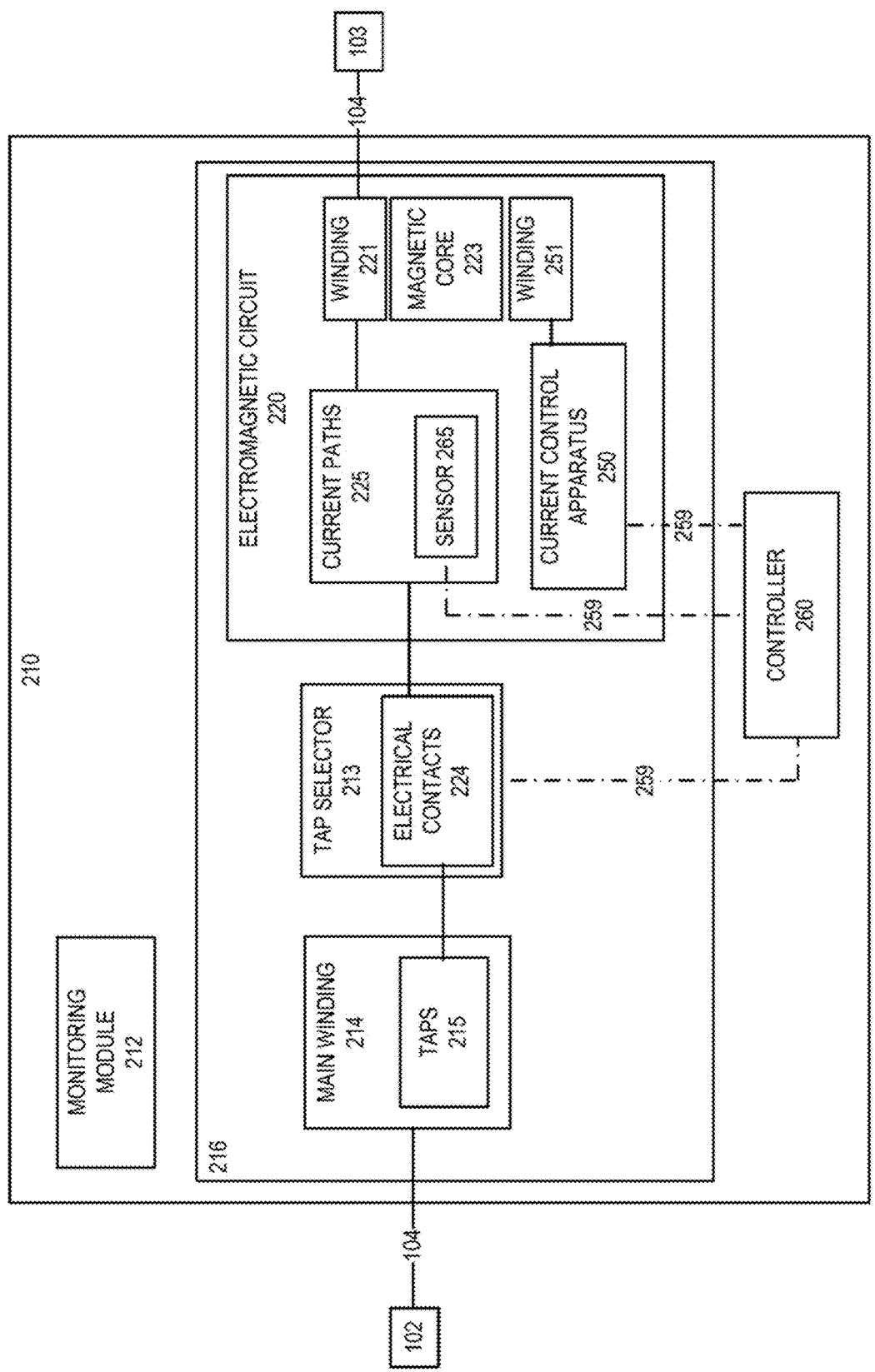
FIG. 2 is a block diagram of an example of a voltage regulator.

Referring to FIG. 2, a block diagram of a voltage regulator 210 is shown. In the example of FIG. 2, the dash-dot lines indicate a data link 259 over which data, such as, for example, information, commands, or numerical data, travel. Solid lines between blocks indicate a path through which current flows between the source 102 and the load 103. The voltage regulator 210 includes a load tap changer and is an example of an implementation of the electrical apparatus 110 (FIG. 1A). The load tap changer includes taps 215 and electrical contacts 224. The voltage regulator 210 monitors and controls the voltage level at the distribution path 104 such that the voltage delivered to the electrical loads 103 (FIG. 1A) is maintained within a desired or acceptable voltage range despite changes in the electrical load 103 and/or changes in the voltage supplied by the source 102 (FIG. 1A).

The voltage regulator 210 includes a monitoring module 212, a tap selector 213, a main winding 214, and at least two taps 215 electrically connected to the main winding 214. The monitoring module 212 may be any type of device capable of measuring or determining the voltage on the distribution path 104. For example, the monitoring module 212 may be a voltage sensor. The tap selector 213 may include, for example, motors, mechanical linkages, and/or electronic circuitry that is capable of connecting the load 103 to the source 102 through any of the taps 215. The voltage regulator 210 also includes an electromagnetic circuit 220. Together, the taps 215, the main winding 214, the tap selector 213, and the electromagnetic circuit 220 form a voltage regulation operation module 216 for the voltage regulator 210.

The tap selector 213 is configured to move an electrical contact 224 and place the electrical contact 224 on a particular one of the taps 215. When one or more of the electrical contacts 224 is connected to one or more of the taps 215, the electromagnetic circuit 220 electrically connects the main winding 214 to the electrical load 103. The taps 215 are separated from each other on the main winding 214, and the output voltage of the voltage regulator 210 depends on the location of the selected tap on the main winding 214. Thus, by controlling which of the taps 215 is connected to the contact or contacts that carry the load current, the output voltage to the load 103 is also controlled. In this way, the voltage delivered to the electrical load 103 may be kept within the acceptable or desired range even if the voltage delivered from the power source 102 changes.

The electromagnetic circuit 220 includes current paths 225. The current paths 225 are any electrically conductive path that is able to conduct current from the contacts 224 to the load 103. The current paths 225 may be any type of electrical cable, transmission line, or wire. The electromagnetic circuit 220 also includes a winding 221, which is wrapped around a magnetic core 223 and is also electrically connected to one of the contacts 224. The magnetic core 223 is similar to the magnetic core 123 (FIGS. 1A-1C), and may be an un-gapped or gapped magnetic core. The electromagnetic circuit 220 also includes a secondary winding 251. The secondary winding 251 is also wrapped around the magnetic core 223. Thus, the winding 221 and the secondary winding 251 are magnetically coupled, and, a time-varying current that flows in the secondary winding 251 induces a corresponding time-varying current in the winding 221.

The electromagnetic circuit 220 also includes a current control apparatus 250. The current control apparatus 250 is electrically connected to the secondary winding 251. The current control apparatus 250 controls the characteristics of a time-varying current that flows in the secondary winding 251, thereby controlling an induced current in the winding 221 and thus also controlling the current in the contact 224 electrically connected to the winding 221. Furthermore, by controlling the current in the secondary winding 251 during a switching operation, saturation of the core 223 may be avoided. The voltage regulator 210 includes an on-load tap changer, meaning that the loads 103 remain connected to the source 102 when an electrical contact 224 is removed from one of the taps 215 and when the electrical contact 224 is connected to one of the taps 215. Because the loads 103 remain connected, removing and/or connecting an electrical contact 224 may generate an arc, which reduces the lifetime of the electrical contact 224. The current control apparatus 250 controls the current in the electrical contact 224. By controlling the current in the electrical contact 224, the current control apparatus 250 results in reduced or eliminated arcing and a longer lifetime for the voltage regulator 210. Additionally, the current control apparatus 250 is electrically isolated from the main winding 214. The electrical isolation allows low-voltage devices (for example, transistors) to be used in the current control apparatus 250, thus reducing costs and complexity.

The voltage regulator 210 also includes a sensor 265 that measures voltage and current in various portions of the electromagnetic circuit 220 and/or to the electrical load 103. The sensor 265 may be located anywhere along the current paths 225. In some implementations, the electromagnetic circuit 220 includes more than one sensor 265. The sensor 265 provides data to a controller 260 via a data link 259. The data link 259 may be any path capable of transmitting data. For example, the data link 259 may be a network cable (such as an Ethernet cable), or the data link 259 may be a wireless connection that is capable of transmitting data.

The controller 260 may be implemented as an electronic controller that includes one or more electronic processors and an electronic memory coupled to the electronic processor. The controller 260 also may include manual or electronic user interface devices that allow an operator of the voltage regulator 210 to communicate with the controller 260. The controller 260 may store instructions, perhaps in the form of a computer program, on the electronic storage. The instructions may relate to manipulation of data received from the sensor 265. For example, the instructions may include a program or process that analyzes voltage and/or current data over a period of time to determine a time-rate of change of voltage and/or current. The electronic storage may store threshold data and instructions to compare determined rates of change with thresholds. The controller 260 also may interact with the current control apparatus 250. For example, the controller 260 may produce signals that, when received by the current control apparatus 250, are sufficient to cause electronic components within the apparatus 250 to perform certain actions.

Figure 3B:
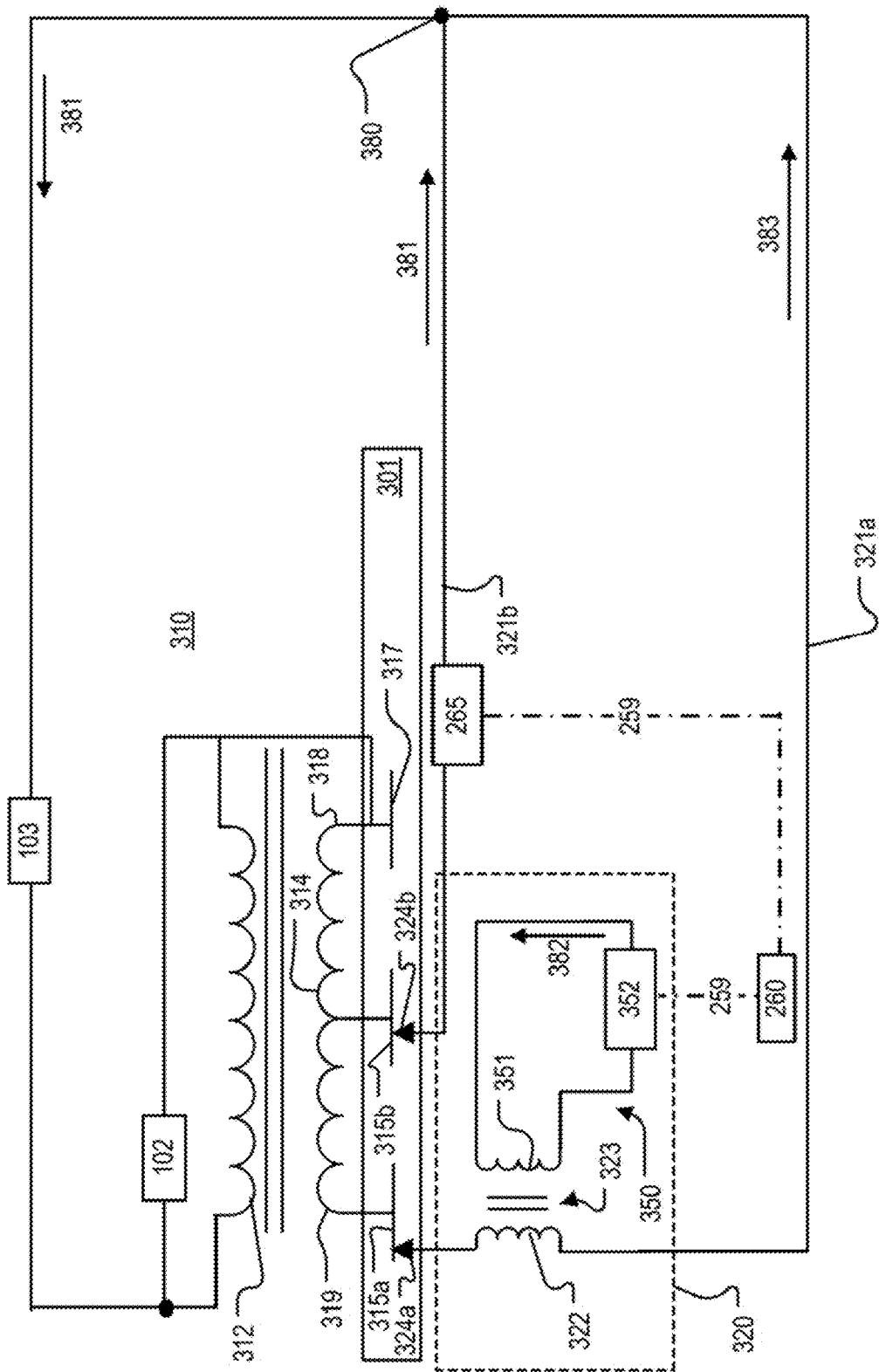
Figure 3C:
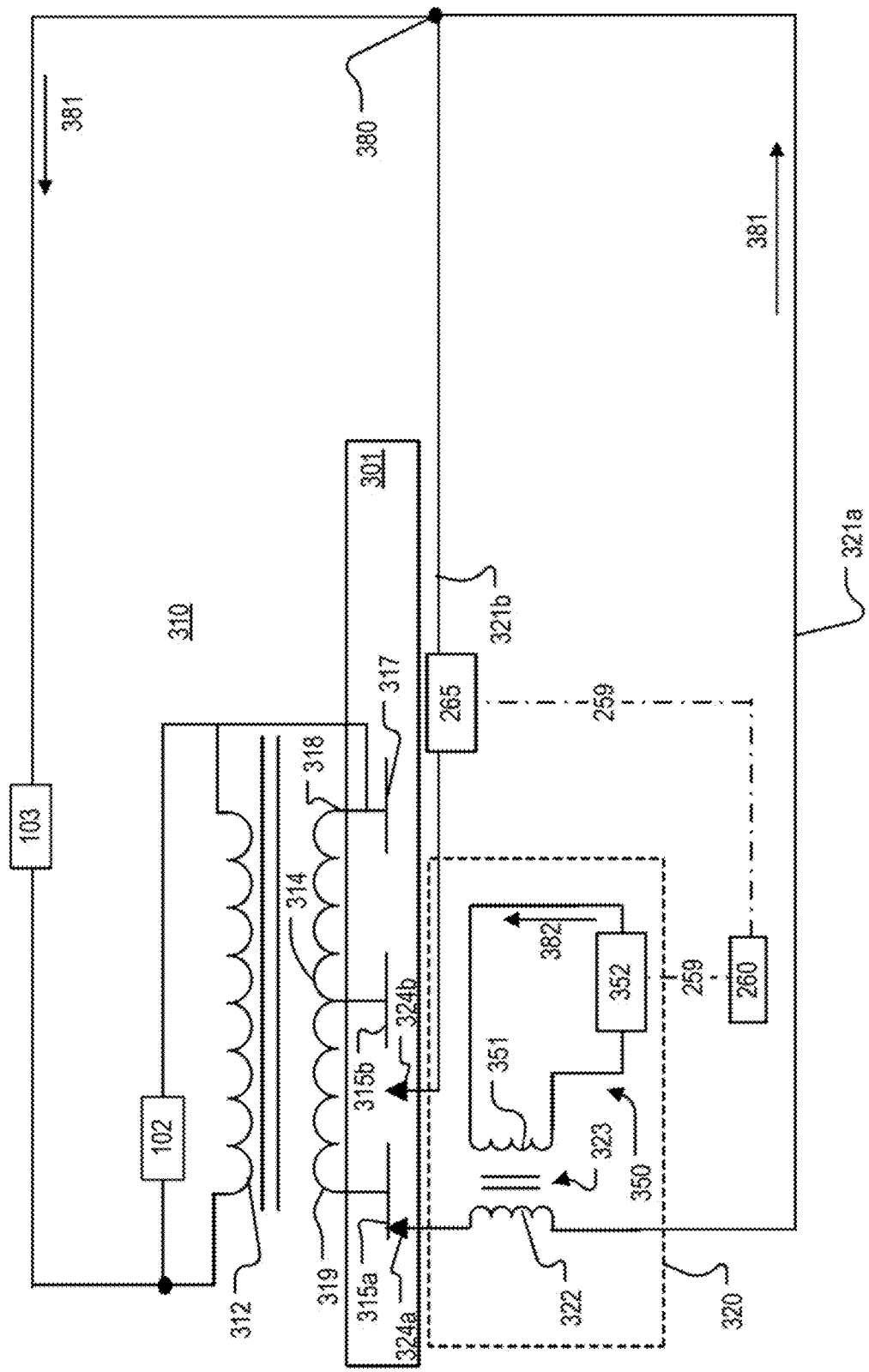
Figure 3D:
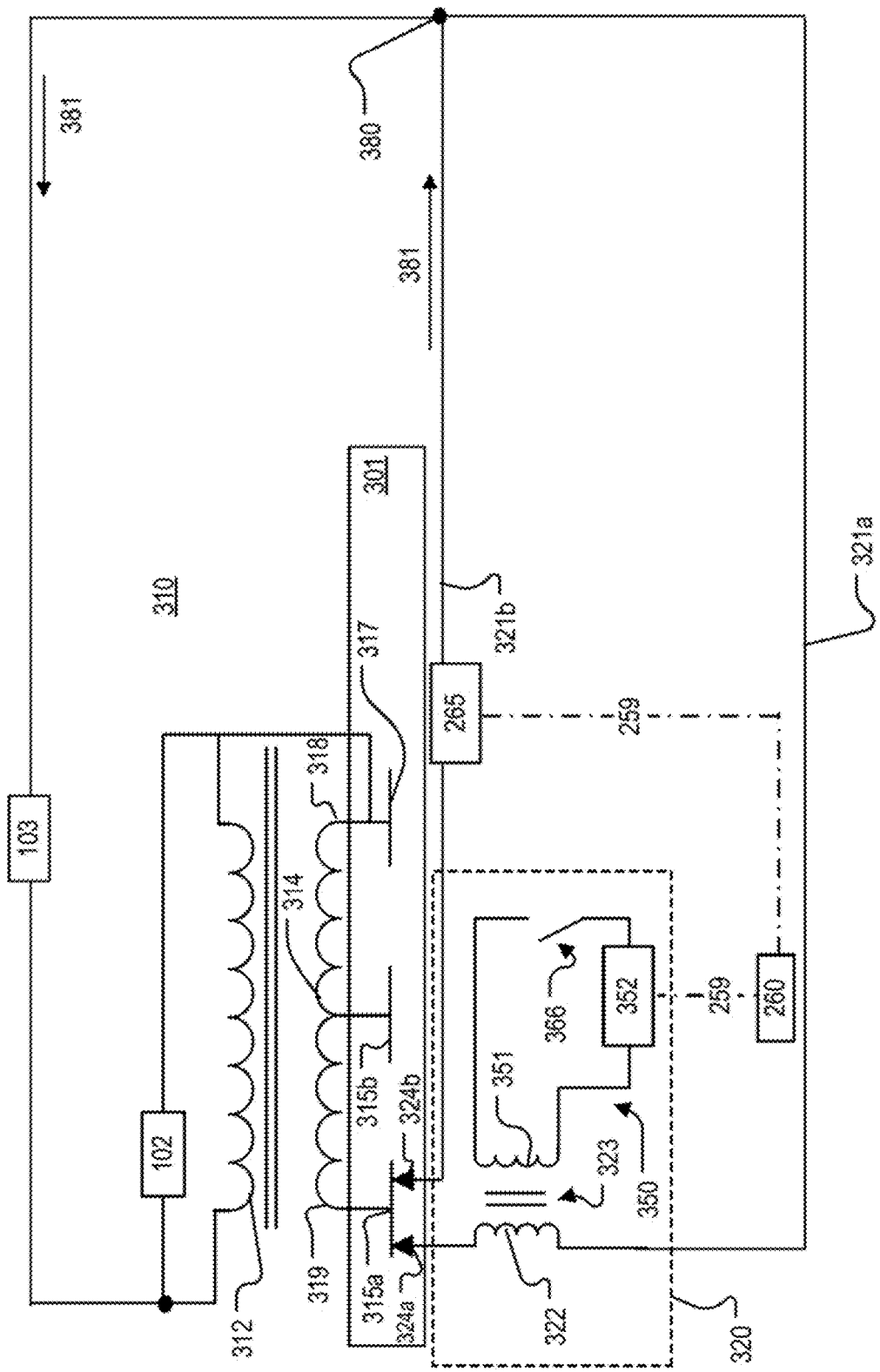
Figure 3E:
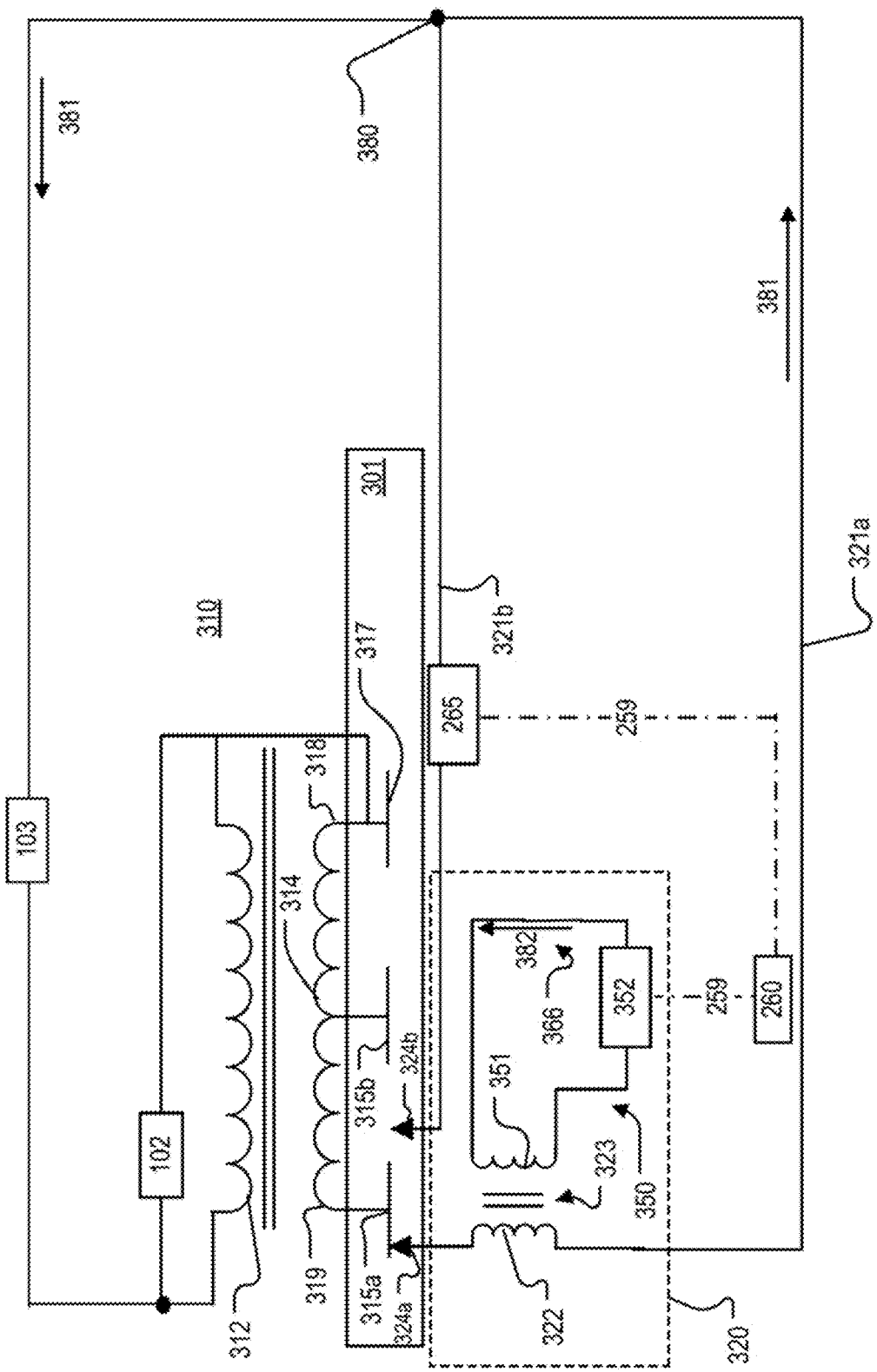

FIGS. 3A-3E are block diagrams of an example of a load tap changer 301. Each of the FIGS. 3A-3E shows the load tap changer 301 at a different time. The load tap changer 301 is part of a voltage regulator 310. FIG. 3A shows an example of the load tap changer 301 operating in steady-state. FIG. 3B shows the load tap changer 301 at a time just prior to breaking a connection to a tap. FIG. 3C shows the load tap changer 301 during a load tap change operation (or a switching operation) and while the primary contact is not connected to a tap. FIG. 3D shows another example of the load tap changer 301 operating in steady-state. FIG. 3E shows another example of the load tap changer 301 during a switching operation.

The voltage regulator 310 may be used in the power distribution network 101 (FIG. 1A) to deliver power from the source 102 to the loads 103. The voltage regulator 310 includes an electromagnetic circuit 320 that delivers a load current 381 to the electrical load 103, and a current control apparatus 350 that controls the current in the electromagnetic circuit 320 and the magnetic flux in the core 323. Controlling the current in the electromagnetic circuit 320 enables more efficient operation of the voltage regulator 310 and extends the lifetime of the load tap changer 301. For example, in some implementations (including the implementation discussed in FIGS. 3A-3E), the current control apparatus 350 enables a contact to be separated from a tap with no or minimal arcing. Reducing the amount of arcing increases the lifetime of the contacts. Additionally, in some implementations, controlling the magnetic flux results in no or minimal in-rush currents when a contact is connected to a tap. This also increases the lifetime of the contacts.

The voltage regulator 310 includes a shunt winding 312 and a main winding 314 (or series winding 314). The shunt winding 312 is in parallel with the source 102, and the main winding 314 is in series with the load 103. The main winding 314 includes at least two taps (taps 315a and 315b are shown in the example of FIGS. 3A-3E). The main winding 314 also includes a neutral point 317. Connecting a contact 324a or 324b to the neutral point 317 causes the load 103 to be energized at the voltage provided by the source 102 without voltage addition or subtraction from the main winding 314. A first end 318 or second end 319 of the main winding 314 is electrically connected to the source 102. As in contemporary voltage regulators, the locations of the source 102 and the load 103 may be reversed, but the voltage regulating function is similar.

The voltage regulator 310 also includes an electromagnetic circuit 320 that is electrically connected to the electrical load 103 via a node 380. The electromagnetic circuit 320 includes a first electrical conductor 321a that is electrically connected to a first contact 324a and to the node 380. The electromagnetic circuit 320 also includes a second electrical conductor 321b that is electrically connected to a second contact 324b and to the node 380. The first electrical conductor 321a, the second electrical conductor 321b, the first contact 324a, and the second contact 324b are made of electrically conductive material. For example, the first electrical conductor 321a may be a metal wire or cable, and the first contact 324a may be formed at an end of the wire or cable. When either of the first contact 324a or the second contact 324b is connected to one of the taps 315a, 315b, the electromagnetic circuit 320 electrically connects the main winding 314 to the node 380 and delivers a load current 381 to the electrical load 103.

The voltage regulator 301 includes the taps 315a, 315b and the contacts 324a, 324b. The output voltage of the voltage regulator 301 is the voltage of the source 102 plus the voltage between the selected tap and the neutral point 317. Thus, the output voltage of the main winding 314 is determined by which tap 315a, 315b is connected to the contact that carries the load current 381. Both of the contacts 324a, 324b may be movable contacts that are capable of contacting either of the taps 315a, 315b. However, in the example discussed below, the contact 324b is the primary contact that generally carries the load current 381, and the contact 324b is moved between the taps 315a, 315b.

The electromagnetic circuit 320 also includes the current control apparatus 350. The current control apparatus 350 includes a secondary winding 351 that is wrapped around a magnetic core 323, and an electrical network 352 that is configured to control the voltage across the secondary winding 351 and the current through the secondary winding 351. The current through the secondary winding 351 is referred to as the bias current 382. By controlling the current through the secondary winding 351, the electrical network 352 allows control of the magnetic flux in the magnetic core 323. For example, the electrical network 352 is able to substantially prevent saturation of the magnetic core 323 during switching of the first contact 324a or the second contact 324b, as discussed below. The electrical network 352 may include any type of current source that is able to produce a time-varying current having a particular amplitude and phase. The electrical network 352 is controlled by the controller 260, which receives data that indicates an amplitude and phase of the current that flows in the second electrical conductor 321b from the sensor 265 via the data link 259.

The first electrical conductor 321a includes a winding 322 that is also wrapped around the magnetic core 323. Thus, the secondary winding 351 and the first electrical conductor 321a are magnetically coupled, and when the bias current 382 flows in the secondary winding 351, a corresponding AC current is induced in the first electrical conductor 321a.

FIGS. 3A-3E show an example of a tap change operation performed to change the output voltage of the voltage regulator 310 by selecting different taps on the main winding 314. In the example discussed below, the contact 324b is removed from the tap 315b, moved toward the tap 315a, and placed in contact with the tap 315a.

FIG. 3A, shows an example of steady-state operation of the voltage regulator 310. Steady-state operation is a normal operating condition in which the contacts 324a, 324b are stationary and neither of the contacts 324a, 324b is in the process of being moved to another tap. During steady-state operation of the voltage regulator 310, the electrical network 352 is controlled such that no current flows in the secondary winding 351 and all of the load current 381 flows through the contact 324b. For example, the controller 260 may open a switch 366 to create an open circuit in the secondary winding 351. Alternatively, the function of the switch 366 may be realized in the electrical network 352. In either case, no current flows in the secondary winding 351, and the winding 322 and the magnetic core 323 can be designed so that the path through the first electrical conductor 321a is a high impedance path. In contrast, the impedance of the second electrical conductor 321b is essentially zero (0), so the load current 381 flows through the contacts 324b and 321b.

FIG. 3B shows the voltage regulator 310 at a time just prior to separating the contact 324b from the tap 315b. An arc will form if the load current 381 is flowing through the contact 324b when the contact 324b is separated from the tap 315b. However, the current control apparatus 350 prevents or mitigates arc formation. The controller 260 receives a signal indicating that the output voltage of the voltage regulator 310 is to be changed. The controller 260 also receives data that includes a measurement of the amplitude and phase of the current that flows in the second electrical conductor 321b (the load current 381) from the sensor 265.

In preparation for separating the contact 324b from the tap 315b, the controller 260 closes the switch 366 such that there is no longer an open circuit in the secondary winding 351, and the controller 260 causes the electrical network 352 to generate a bias current 382. The controller 260 controls the electrical network 352 such that the bias current 382 flows through winding 351 inducing a circulating current 383 through winding 322 having the same amplitude and phase as the load current 381. The ratio of bias current 382 to the circulating current 383 depends on the number of turns in the winding 322 and the secondary winding 351. This relationship is well understood by those who practice the art. The circulating current 383 adds to the current 381 flowing in the second electrical conductor 321b such that when the amplitude and phase of the circulating current 383 is properly controlled, the sum of current in the contact 324b is zero (0). The contact 324b is then separated from the tap 315b. Because no current is flowing in the contact 324b at the time of separation, an arc is not formed. In some implementations, the circulating current 383 is not precise enough to cause the current in the contact 324b to be precisely zero (0). However, in these implementations, the presence of the circulating current 383 reduces the current in the contact 324b such that the root-mean-square (RMS) current in the contact 324b is less than the load current 381 and some performance improvement may still be realized.

FIG. 3C shows the voltage regulator 310 after the contact 324b has separated from the tap 315b but before the contact 324b has joined to the tap 315a. No current flows in the contact 324b when the contact 324b is not connected to the tap 315a or the tap 315b. The short circuit path for current for the circulating current 383 has been removed. As a result, the contact 324a must carry the entire load current 381 during the period in which the contact 324b does not touch one of the taps 315a, 315b. To create a low impedance path through the winding 322, the flux in the core 323 is controlled to zero (0) by the electrical network 352. The flux in the core 323 is controlled to zero by controlling the amplitude and phase of the bias current 382. Alternatively, the electrical network 352 is shorted such that it appears as a low impedance and has a negligible effect on the impedance of winding 322.

FIG. 3D shows the voltage regulator 310 after the contact 324b is connected to the tap 315a, and the load tap changer 301 returns to steady-state operation. In the example shown in FIG. 3D, after the contact 324b is connected to the tap 315a, the controller 260 opens the switch 366 to create an open circuit in the secondary winding 351. The open circuit causes the impedance of the secondary winding 351 and the first electrical conductor 321a to be higher than the impedance of the second electrical conductor 321b. Thus, all the load current begins to flow through the contact 324b to the node 380 again.

A procedure similar to that discussed above is used to separate the contact 324b from the tap 315a. To move the contact 324b back to the tap 315b, the controller 260 closes the switch 366, and causes the electrical network 352 to generate the bias current 382, which induces a circulating current 383 that has the same amplitude and phase as the load current 381 that flows in the second electrical conductor 321b. The bias current 382 induces the circulating current 383 in the first electrical conductor 321a, and the circulating current 383 cancels the current that flows in the second electrical conductor 321b. Thus, current stops flowing through the contact 324b and the contact 324b may be removed from the tap 315a without producing an arc.

Referring also to FIG. 3E, while the contact 324b is not contacting the tap 315a or the tap 315b, the electrical network 352 is controlled to adjust the flux in the core 323. In particular, the electrical network 352 adjusts the magnetic flux in the magnetic core 323 to substantially prevent saturation of the core 323. Saturation occurs when the magnetic core 323 reaches its flux carrying limit. When saturated, the magnetic core 323 is unable to carry more flux, and additional flux must be carried by the medium that surrounds the magnetic core 323 (free space in this example). The medium that surrounds the magnetic core 323 has a much lower magnetic permeability than the magnetic core 323. Thus, the effective impedance (for example, the inductance) of the winding 322 is dramatically reduced. If the saturation condition is present when the contact 324b is connected to the tap 315b (or makes with the tap 315b), the relatively low effective impedance caused by the saturation may result in generation of a circulating current that has a much greater amplitude than a typical circulating current, and the large circulating current may cause damage to the contacts 324a, 324b and/or other components of the voltage regulator 310. As such, it is desirable to control the magnetic flux in the magnetic core 323 during a switching operation to avoid saturation or lessen the likelihood of saturation occurring.

The cause of saturation of the magnetic core 323 during a switching operation (in this example, while the contact 324b is not on either the taps 315a, 315b) is the state of the magnetic flux within the magnetic core 323 just prior to and immediately after the contact 324b is connected to the tap 315b. For example, while the contact 324b is transitioning to the tap 315b (as shown in FIG. 3E), the contact 324a carries all of the load current 381. The impedance of the winding 322 is in series with the impedance of the load 103, and a voltage drop (Vi) forms across the winding 322. The current flowing in the winding 322 forms a time-varying magnetic field proportional to (Vi) in the magnetic core 323. When the contact 324b makes with the tap 315b, the voltage drop across the winding 322 immediately becomes equal to a voltage Vt, which is the voltage difference between the tap 315a and the tap 315b. Because the winding 322 has an impedance that is essentially completely inductive, and the load has an impedance that is mostly resistive with some inductive components, the phase of Vi and Vt is generally not the same. Thus, the flux in the magnetic core 323 may be within saturation limits when the voltage Vi is the voltage across the winding 322, but the additional change in flux imposed by the change in voltage to the voltage Vt may cause the core 323 to saturate.

To prevent saturation, the electrical network 352 controls the flux in the magnetic core 323 during the switching operation. For example, the electrical network 352 controls the magnitude and phase of the current through the winding (the bias current 382) to ensure that the flux in the core 323 remains within the saturation limit when the contact 324b is connected to the tap 315b. In other words, prior to the contact 324b making with the tap 315b, the electrical network 352 controls the magnitude and phase of the current 382 such that the flux in the core 323 is adjusted to a phase and magnitude that will prevent saturation when the contact 324b makes, thus causing the voltage of the winding between the tap 315a and the tap 315b to appear across winding 322. The electrical network 352 may control the flux in the core 323, by, for example, reducing the absolute value of the magnetic flux in the core 323. The absolute value of the magnetic flux in the core 323 may be reduced by allowing a current to flow in the winding 322. The magnetic flux in the core 323 may be reduced by increasing or decreasing the bias current 382. In some implementations, the electrical network 352 controls the flux in the magnetic core 323 to match an ideal flux profile that is to be achieved after the switching operation is completed.

Figure 4:
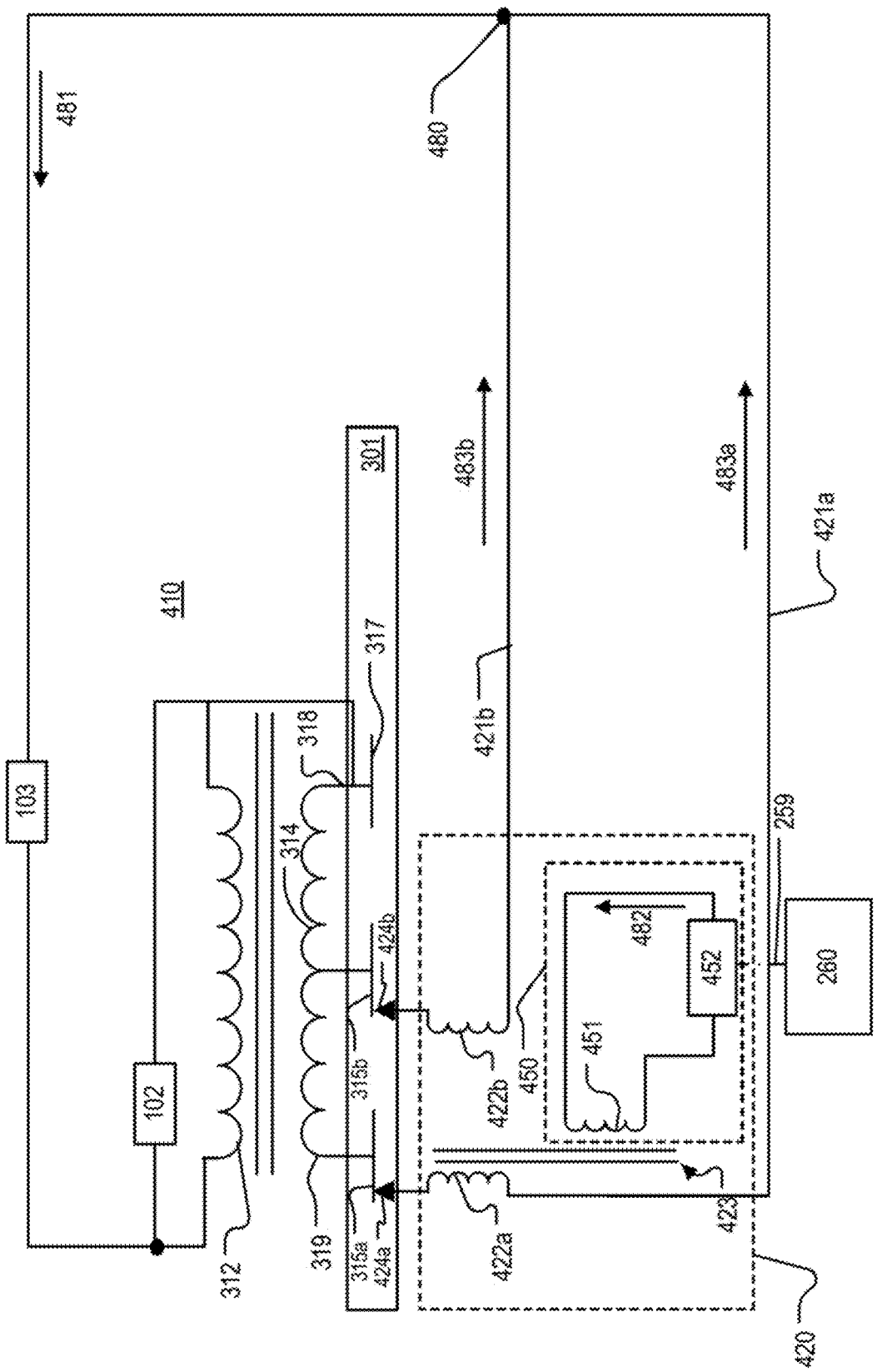
FIG. 4 is a block diagram of another example of a voltage regulator.

Referring to FIG. 4, a block diagram of a voltage regulator 410 is shown. The voltage regulator 410 is another example of a voltage regulating electrical apparatus 110 that may be used with the electrical power distribution network 101 (FIG. 1A). The voltage regulator 410 includes the shunt winding 312, the main winding 314, and the load tap changer 301, which includes the taps 315a, 315b, a first contact 324a, and a second contact 324b. The voltage regulator 410 also includes an electromagnetic circuit 420 that electrically connects one or both of the taps 315a, 315b to the electrical load 103 to deliver a load current 481 to the electrical load 103. A current control apparatus 450 that controls the current in the electromagnetic circuit 420 such that the current flowing through a contact connected to one of the taps 315a, 315b is driven to zero prior to separating that contact from the tap.

The electromagnetic circuit 420 includes a first electrical conductor 421a, which includes a first winding 422a that is wound around a magnetic core 423. The electromagnetic circuit 420 also includes a second electrical conductor 421b, which includes a winding 422b that is also wound around the magnetic core 423. Thus, the first electrical conductor 421a and the second electrical conductor 421b are magnetically coupled and a time-varying current in the first electrical conductor 421a induces a corresponding time-varying current in the second conductor 421b, and vice versa. The first contact 424a is electrically connected to the first electrical conductor 421a, and the second contact 424b is electrically connected to the second electrical conductor 421b. The electrical contacts 424a, 424b share the load current during steady state operation providing benefits over the implementation shown in FIGS. 3A-3E, which will be apparent to those skilled in the art.

Under steady-state conditions, equal load current flows in the first and second electrical conductors 421a, 421b. A current 483a flows in the first electrical conductor 421a, and a current 483b flows in the second electrical conductor 421b. Because the first and second electrical windings 422a, 422b are magnetically coupled, the load current 481 divides evenly between the conductors 421a, 421b when the windings 422a, 422b have the same number of turns. When the contact 424a is connected to the tap 315a and the contact 424b is connected to the tap 315b, a circulating current (Ix) flows in the electromagnetic circuit 420 in addition to the load current 481 because of the voltage from main winding 314 existing between taps 315a, 315b. The circulating current travels in opposite directions in each of the electrical conductors 421a, 421b. In the example of FIG. 4, the current 483a has an amplitude of half of the load current 481 plus the circulating current (Ix), and the current 483b has an amplitude of half of the load current 481 minus the circulating current (Ix). Thus, the circulating current balances out and is not delivered to the electrical load 103.

Historically, the magnetic core 423 was designed as a gapped core. A gapped core includes gaps of non-magnetic material between segments of magnetic material. The configuration of the gaps controls the impedance of the windings 422a and 422b and determines saturation characteristics of the core 423. Generally, the windings 422a and 422b have a relatively low impedance when a gapped core is used. The configuration of the gaps is typically selected to produce a trade-off between circulating current and saturation of the core during switching.

On the other hand, the configuration and presence of the current control circuit 450 makes it possible to use an un-gapped core or a core with a gap that is smaller than a typical gapped core. The core used for a high-current voltage regulator may have a total core gap of about one (1) inch to achieve the desired impedance. Using the current control circuit 450 may allow the reduction of the core gap to perhaps 1/10th inch or 1/100th inch or less. The result would be circulating current reduction of approximately 90% or 99% or more, respectively. The reduction in circulating current results in lower $I^2R$ losses and the smaller gap size may additionally reduce stray losses. This may lead to a reduction in losses of tens to hundreds of watts depending on the size of the voltage regulator. The current control apparatus 450 allows the control of magnetic flux during switching to prevent saturation, as discussed above. As a result, the magnetic core 423 may be designed without gaps, thus allowing the windings 422a and 422b to have a high impedance and to thereby effectively minimize the steady-state circulating current substantially close to zero. The reduced circulating current results in less total current flowing in the contacts 424a and 424b, thereby allowing the contacts 424a,b to be designed for lower current than previously required. Moreover, the high impedance of the windings 422a and 422b reduces the electrical losses of the electromagnetic circuit 420 as compared to a design that uses a gapped magnetic core 423.

The electromagnetic circuit 420 also includes the current control apparatus 450, which controls the current in the first conductor 421a and/or the second conductor 421b. The current control apparatus 450 includes a secondary winding 451, which is wound around the magnetic core 423, and an electrical network 452. The electrical network 452 may include an AC current source. Because the secondary winding 451 is wound around the same magnetic core as the first and second windings 422a, 422b, the secondary winding 451 is also coupled to the first and second windings 422a, 422b. Thus, a current that flows in the secondary winding 451 induces a corresponding circulating current in the first and second electrical conductors 421a, 421b with characteristic similar to the circulating current (Ix).

The electrical network 452 is coupled to the controller 260, which receives data that indicates the phase and amplitude of the current that flows in the first electrical conductor 421a and the second electrical conductor 421b. During steady-state operation, the current control apparatus 450 is not used to influence the current in the electromagnetic circuit 420, and the secondary winding 451 may be open circuited (for example, by opening a switch such as the switch 366 of FIG. 3A). Just prior to removing a contact from a tap, the controller 260 closes the switch such that current is able to flow in the secondary winding 451.

An example of the operation of the current control apparatus 450 during a tap change operation in which the contact 424b is separated from the tap 315b is discussed. The controller 260 receives an indication of an upcoming tap change operation and the controller 260 causes the switch to close so that a bias current 482 from the electrical network 452 flows in the secondary winding 451. The bias current 482 is controlled to produce a circulating current (Ix) with a magnitude that is the same as the magnitude as the current 483b, and a phase that is opposite to the phase of the current 483b. The bias current 482 induces a corresponding current in the second electrical conductor 421b. The corresponding current cancels the current that flows through the contact 424*b* such that no current flows in the contact 424*b*, and the contact 424*b* is removed from the tap 315*b* without generating an arc.

Figure 5:
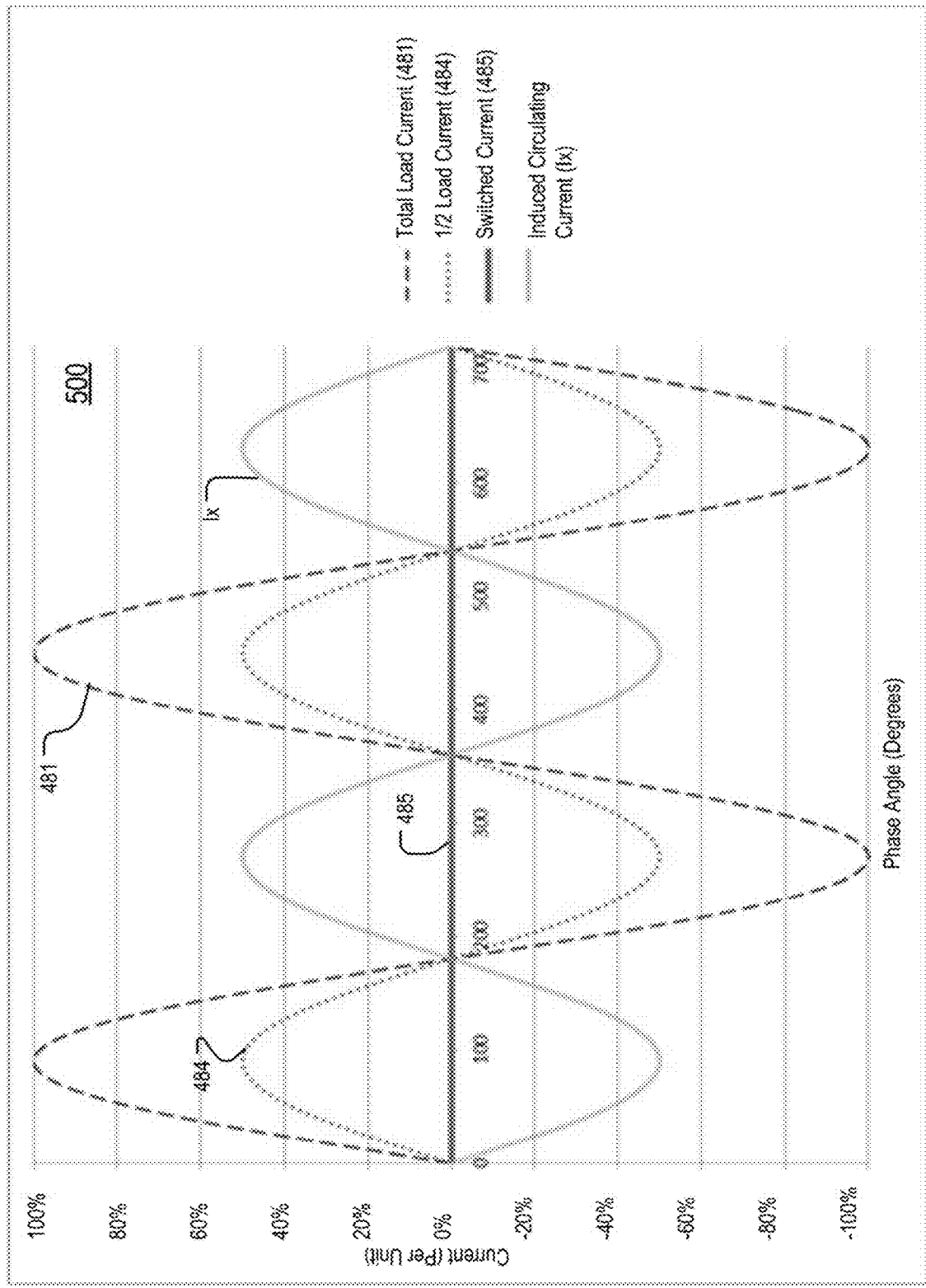
FIGS. 5 and 6 are examples of simulated data.

Referring also to FIG. 5, a plot 500 shows a simulated example of the circulating current (Ix) produced by the bias current 482 relative to the load current 481 and to half of the load current (labeled as 484). The curves labeled as Ix, 481, 484, 485 on the plot 500 represent instantaneous current amplitude (y axis) and phase (x axis) as a function time. In the example of FIG. 5, prior to separation, the contact 424*b* carries a current that is labeled as 484. The current 484 has an amplitude that is half of the amplitude of the load current 481 and has a phase that is the same as the phase of the load current 481. The bias current 482 induces the circulating current Ix in the windings 422*a*, 422*b*. The induced circulating current Ix has an equal amplitude as the load current flowing in the second electrical conductor 421*b* and is 180° out of phase. As such, the induced circulating current Ix drives the current in the second electrical conductor 421*b* to zero (0). Thus, the second contact 424*b* can be removed from the tap 315*b* without generating an arc. The net current that flows in the second electrical conductor 421*b* after the bias current 482 flows in the secondary coil 451 is represented by the data labeled 485 in the plot 500.

Figure 6:
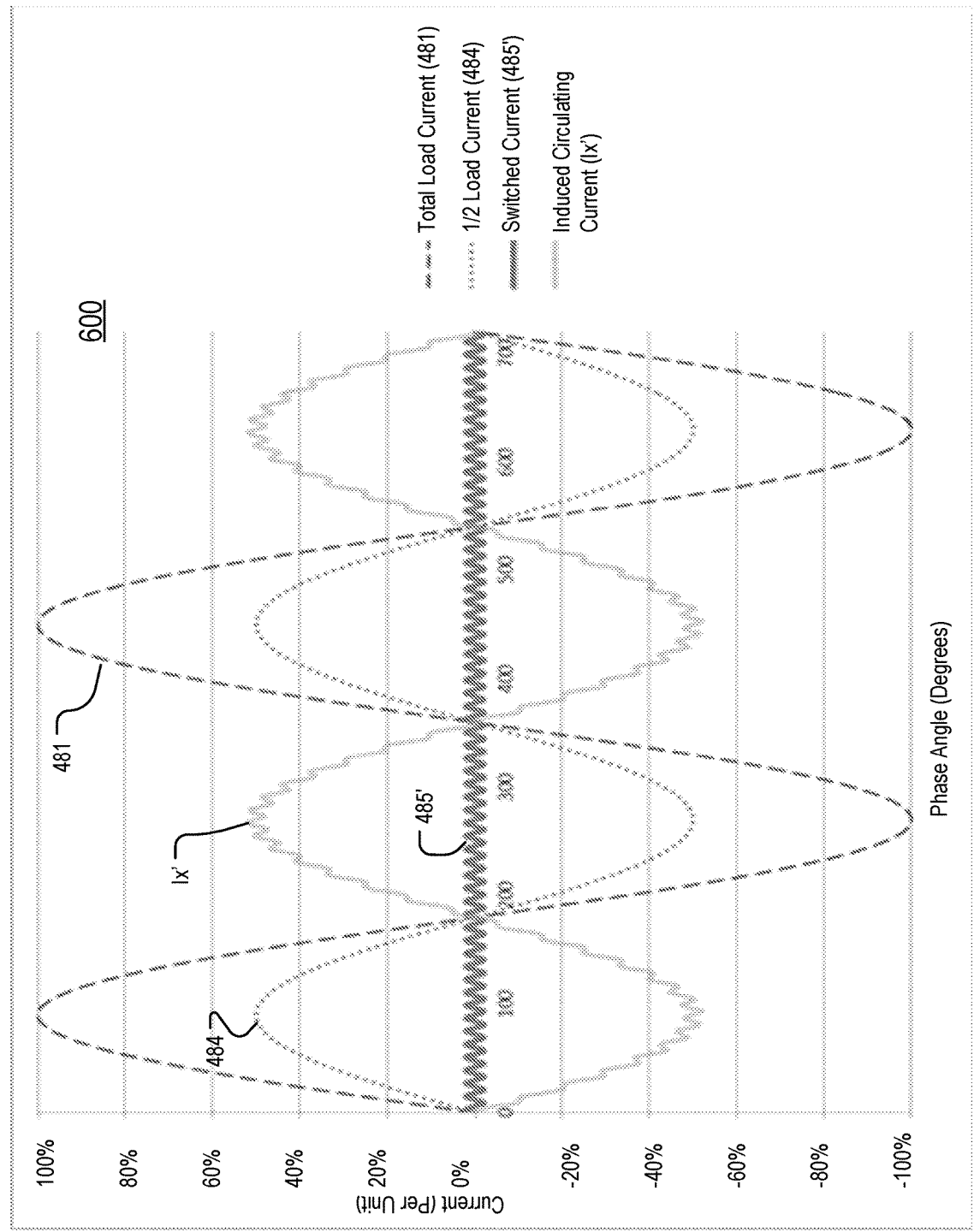

Referring also to FIG. 6, a plot 600 shows a simulated example based on an implementation in which a low-amplitude, high-frequency current is superimposed on the bias current 482 to form a bias current 482'. The current (Ix') induced in the second electrical conductor 421*b* also has the low-amplitude, high-frequency ripple. The load current 481 is not affected by the presence of the low-amplitude, high-frequency ripple. Thus, the net current that flows in the second electrical conductor 421*b* (labeled as switched current 485') also has the low-amplitude, high-frequency ripple. In the situation in which the bias current 482 is not accurate enough to create a circulating current to completely cancel the current 483*b*, the ripple produces more frequent opportunities for zero crossings in the net current 485. A zero crossing in the net current 485 represents an instance in time when there is no current flowing in the second contact 424*b*. A zero crossing is required to extinguish the arc of a traditional load tap changer. Thus, the presence of the ripple reduces the duration of the arc and therefor reduces the arc energy as compared to a situation in which there is no ripple and the bias current is not accurate enough to bring the net current in the second electrical contact 421*b* to zero.

The low-amplitude, high-frequency current used to form the bias current 482' and the current Ix' may have a frequency that is, for example, four to twenty times the system frequency. For example, in an implementation in which the system frequency is 50 Hz, the high-frequency current may have a frequency of 200 Hz to 1000 Hz. In an implementation in which the system frequency is 60 Hz, the high-frequency current may have a frequency of 240 Hz to 1200 Hz. The amplitude of the low-amplitude, high-frequency current used to form the bias current 482' may result in a switched current 485', for example, of 5 to 20 Amperes (A).

Figure 7A:
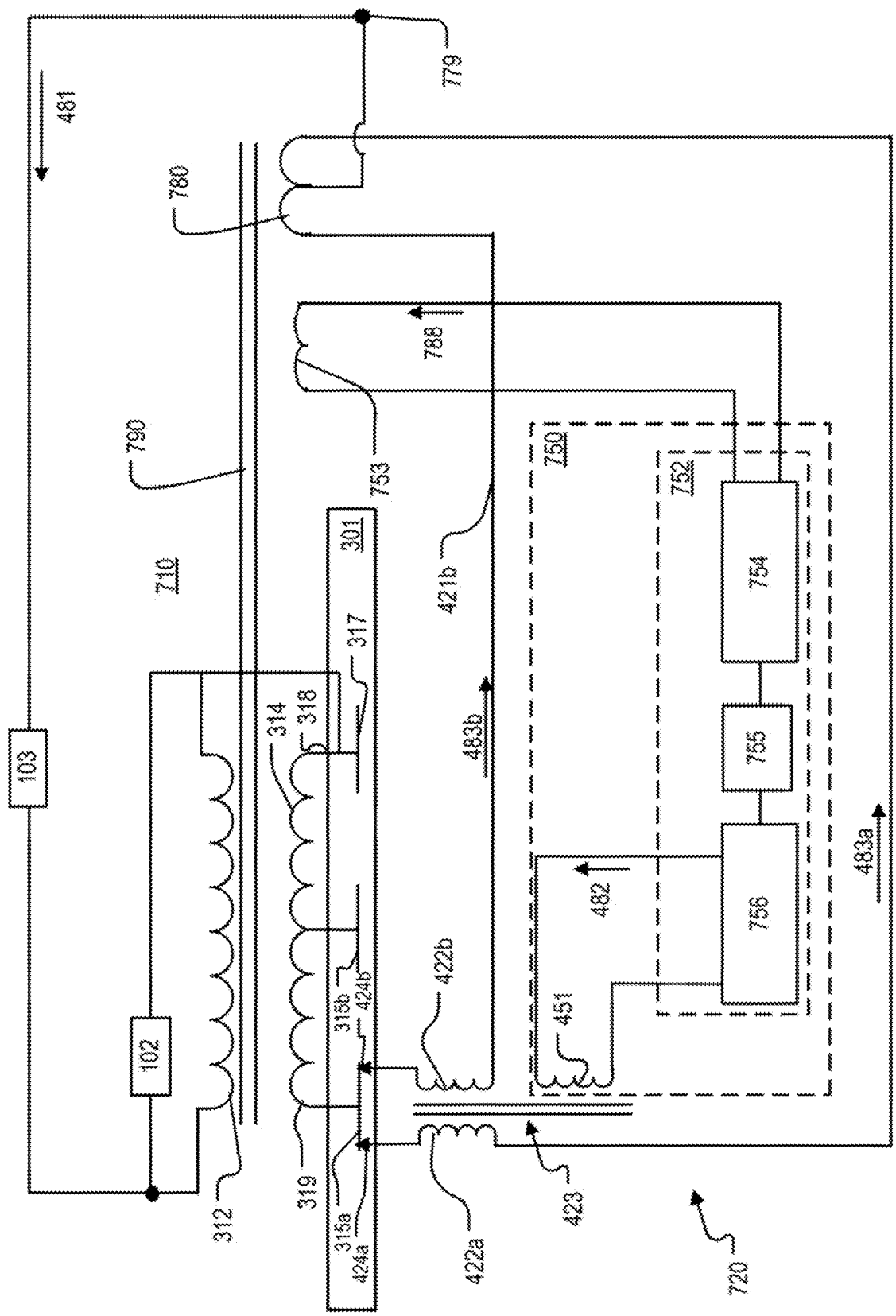
FIG. 7A is a block diagram of another example of a voltage regulator.

Referring to FIG. 7A, a block diagram of another example voltage regulator 710 that includes the load tap changer 301 is shown. The voltage regulator 710 is an example of an implementation of the voltage regulator 410. The voltage regulator 710 includes an electrical network 752. The electrical network 752 functions as an AC current source that produces the bias current 482. The voltage regulator 710 also includes a current control apparatus 750, which controls an amount of magnetic flux in a magnetic core 423.

In the voltage regulator 710, the first electrical conductor 421*a* and the second electrical conductor 421*b* are electrically connected to an equalizer winding 780 that is magnetically coupled to the main winding 314. The equalizer winding 780 is also electrically connected to a node 779 and the electrical load 103. Additionally, in the voltage regulator 710, the bias current 482 is generated by the electrical network 752. The electrical network 752 is electrically connected to a winding 753, which is magnetically coupled to the shunt winding via a core 790 and draws power from the shunt winding 312. Thus, the time-varying (AC) current in the shunt winding 312 from the source 102 induces a corresponding time-varying (AC) current 788 in the winding 753. Together, the winding 753, the winding 312, and their common core (the core 790) form a voltage transformer.

The electrical network 752 includes a rectifier 754, which converts the AC current 788 that flows in the winding 753 to a direct current (DC), a DC link 755 (or DC bus 755), and an inverter 756, which converts DC energy stored in the DC link 755 into AC current to produce the bias current 482. The DC link 755 stores DC energy and regulates a current ripple between the rectifier 754 and the inverter 756. The DC link 755 may include one or more capacitors and/or inductors.

The rectifier 754 is any type of electrical network that is capable of converting an AC current into a DC current. The rectifier 754 may utilize controlled switches such that it can return power from the DC link 755 to the AC power system 100 through the winding 753, which is magnetically coupled to the shunt winding 312. The controlled switches may be, for example, transistors, such as, MOSFETS, BJTs, and/or IGBTs. Thus, in implementations in which controlled switches are used in the rectifier 754, the rectifier 754 serves two purposes. First, the rectifier converts AC current into DC current that is supplied to the DC link 755, which stores energy that the inverter 756 uses to produce the bias current 482. Second, the rectifier 754 is able to compensate reactive power from the power distribution network 101. In other words, the rectifier 754 is able to accept reactive power, which may be expressed in units of volt-ampere reactive (VAr), and to provide reactive power to the power distribution network 101. The ability of the rectifier to compensate reactive power improves the power factor in the power distribution network 101. Thus, the rectifier implemented with controllable switches allows a single apparatus (the rectifier) to serve more than one purpose, thereby reducing the need for additional components and providing a more efficient design.

Figure 7B:
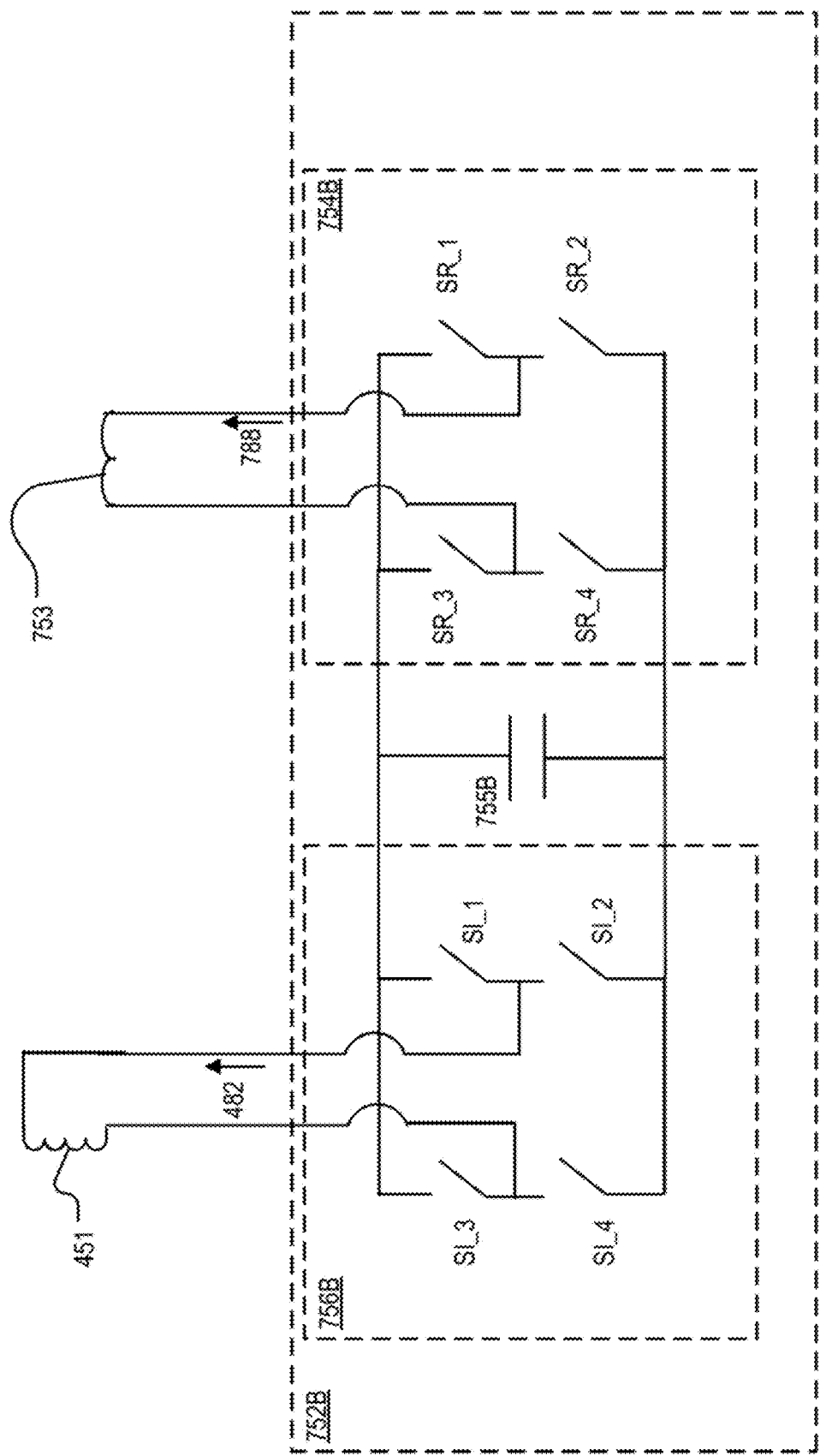
FIG. 7B is a block diagram of an example of an electrical network.

The inverter 756 is any type of electrical network that converts the DC energy in the DC link into an AC current (the bias current 482). In some implementations, the rectifier 754 and the inverter 756 are implemented as two H-bridges. FIG. 7B is a block diagram of an example current source 752B. The current source 752B is an example implementation of a current source that may be used as the electrical network 752. The current source 752B includes a rectifier 754B and an inverter 756B coupled to each other by a DC link 755B. The rectifier 754B and the inverter 756B are implemented as H-bridges.

An H-bridge is a circuit that includes four (4) switches. The switches may be, for example, transistors, diodes, or any other mechanism that may be configured to allow current to flow or to prevent the flow of current. In the example of FIG. 7B, the rectifier 754B includes switches SR_1, SR_2, SR_3, and SR_4. The inverter 756B includes switches SI_1, SI_2, SI_3, and SI_4. The DC link 755B is a capacitor that is electrically connected between the rectifier 754B and the inverter 756B.

Figure 7C:
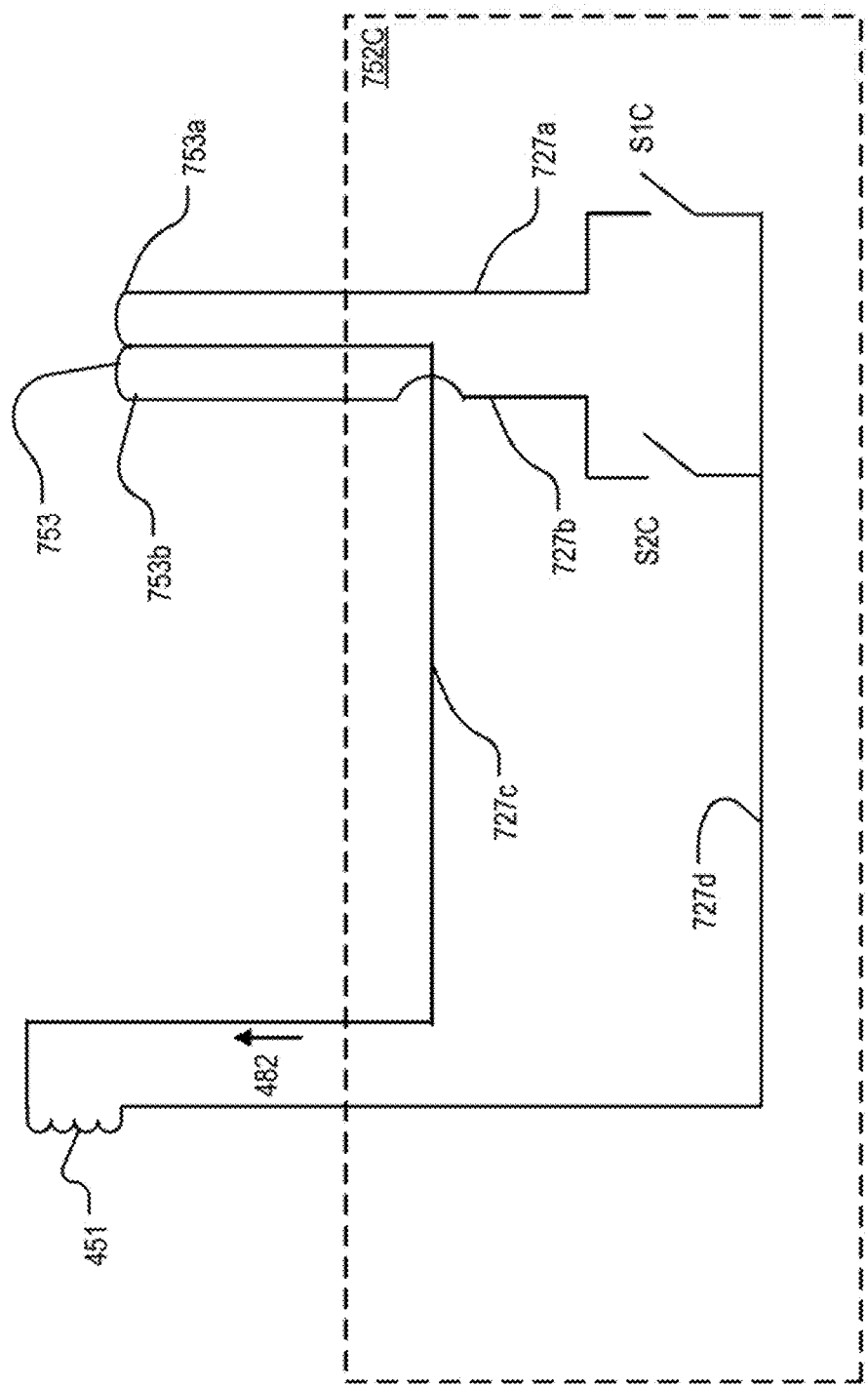
FIG. 7C is a block diagram of another example of an electrical network.

FIG. 7C is a block diagram of a current source 752C. The current source 752C may be used as the electrical network 752 (FIG. 7A). The current source 752C generates the bias current 482 directly from the AC electrical power that flows in the winding 753. As shown in FIG. 7A, the winding 753 is magnetically coupled to the core 790 (FIG. 7A), which draws power from the shunt winding 312. The source 102 provides an AC current that flows in the shunt winding 312. Thus, the AC current in the winding 753 is current that is induced due to electrical power that is already present in the core 790.

The current source 752C includes switches S1C, S2C. The switches S1C, S2C have at least two stable states, one state in which the switch conducts current and another state in which the switch does not conduct current. The switches S1C, S2C may be, for example, transistors, such as MOSFETS, BJTs, and/or IGBTs. The switches S1C, S2C may be controlled, for example, by controlling the voltage at the gate of the transistor.

The winding 753 is electrically connected to the secondary winding 451 via an electrical conductor 727c. The switch S1C is electrically connected to a first terminal 753a of the winding 753 via an electrical conductor 727a. The switch S2C is electrically connected to a second terminal 753b of the winding 753 via an electrical conductor 727b. Both of the switches S1C, S2C are electrically connected to the secondary winding 451 via an electrical conductor 727d. Controlling the state of the switches S1C, S2C determines the polarity of the voltage across the secondary winding 451 and the direction of the bias current 482. For example, the bias current 482 flows in a first direction when the switch S1C conducts current and the switch S2C does not conduct current, and the bias current 482 flows in the opposite direction when the switch S1C does not conduct current and the switch S2C conducts current.

The current source 752C uses the AC current that flows in the winding 753 to generate the bias current 482 instead of using an inverter, such as the inverter 756 (FIG. 7A). In other words, the winding 753 acts as an AC current source. Thus, in implementations of the voltage regulator 710 (FIG. 7A) in which the current source 752C is used as the electrical network 752, the electrical network 752 is directly powered by an AC current source.

Referring to FIG. 7D, a block diagram of a voltage regulator 710D is shown. The voltage regulator 710D is another example of an implementation of the voltage regulator 410 (FIG. 4). The voltage regulator 710D is similar to the voltage regulator 710 (FIG. 7A), except the voltage regulator 710D does not include the winding 753, and the voltage regulator 710D includes a current control apparatus 750D instead of the current control apparatus 750.

The current control apparatus 750D includes a current source 752D. The current source 752D is electrically connected to the equalizer winding 780. The AC current source 752D includes switches S1D, S2D. The switches S1D, S2D may be, for example, transistors. The switch S1_D is electrically connected to an electrical conductor 727a_D. The electrical conductor 727a_D is connected to the conductor 421b, which is electrically connected to a terminal 780a of the equalizer winding 780. The switch S2D is electrically connected to an electrical conductor 727b_D, which is electrically connected to a terminal 780b of the equalizer winding 780. The switches S1D, S2D are also electrically connected to the secondary coil 451. The equalizer winding 780 is electrically connected to the secondary winding 451 via an electrical conductor 727c_D. Controlling the state of the switches S1D, S2D determines the polarity of the voltage across the secondary winding 451 and the direction of the bias current 482. For example, the bias current 482 flows in a first direction when the switch S1D conducts current and the switch S2D does not conduct current, and the bias current 482 flows in the opposite direction when the switch S1D does not conduct current and the switch S2D conducts current.

The current source 752D uses the AC current that flows in the equalizer winding 780 to generate the bias current 482 instead of using an inverter, such as the inverter 756 (FIG. 7A). In other words, the equalizer winding 780 acts as an AC current source, and the current source 752D is directly powered by an AC current source.

Referring to FIG. 8A, a block diagram of a voltage regulator 810 that includes the load tap changer 301 is shown. The voltage regulator 810 may be used in the power distribution network 101 (FIG. 1A) to deliver power from the source 102 to the electrical load 103. The load tap changer 810 includes the electromagnetic circuit 420, which electrically connects the source 102 to the electrical load 103 by connecting the contact 424a and/or the contact 424b to a tap. The voltage regulator 810 also includes a current control apparatus 850, which controls an amount of magnetic flux in a magnetic core 423.

The current control apparatus 850 includes an electrical network 857, a secondary winding 851 that is electrically connected to the electrical network 857, and a sensor 265 that is configured to measure the voltage across the secondary winding 851 and/or the current in the secondary winding 851 and/or flux in the core 423. The electrical network 857 includes one or more electronic components configured to short the secondary winding 851. For example, the electrical network may include a controllable electronic switch, such as a transistor. Like the windings 422a, 422b, the secondary winding 851 is wrapped around the magnetic core 423. Thus, the secondary winding 851 is magnetically coupled to the first winding 422a and the second winding 422b and to the electromagnetic circuit 420. The sensor 265 is coupled to the controller 260 via a data link 259. The sensor 265 is configured to provide measurements of the current and/or voltage and or flux to the controller 260. The controller 260 processes the measurements, and provides command signals to the current control apparatus 850.

The current control apparatus 850 eliminates or greatly reduces losses related to a gapped magnetic core. Moreover, the current control apparatus 850 makes it feasible to use an un-gapped magnetic core or a magnetic core that has a smaller than typical gap as the magnetic core 423. Using a gapped magnetic core or a magnetic core with a smaller than typical gap as the magnetic core 423 results in a higher impedance for the windings 422a and 422b, leading to lower losses and less circulating current in steady-state. Un-gapped magnetic cores and cores that have a smaller than typical gap are generally more prone to saturation during switching. However, by controlling the magnetic flux in the core 423, the current control apparatus 850 is also able to prevent saturation of the core 423 during a switching operation in implementations in which an un-gapped magnetic core or a magnetic core with a smaller than typical gap is used as the magnetic core 423.

Under steady-state conditions, both of the contacts 424a, 424b are connected to the same tap or adjacent taps, the electrical network 857 is an open circuit, and current does not flow in the secondary winding 851. The contact 424b is separated from the tap 315a and moved to the tap 315b. In this position, the output voltage at node 480 is the average of the taps 315a, 315b if windings 422a, 422b have the same number of turns. Subsequently, the contact 424a may be separated from the tap 315a and moved to the tap 315b so that both of the contacts 424a, 424b make contact with the tap 315b. Only the movement of the contact 424b is discussed in the example below.

When the contact 424b is separated from the tap 315a, an arc is formed because, unlike the current control apparatuses 350, 450, and 750, the current control apparatus 850 does not reduce the current in the contact 424a prior to separation. After the contact 424b separates from the tap 315a and the arc is interrupted, all load current is transferred to the contact 424a, and the voltage across the secondary winding 851 changes (for example, increases) rapidly. The sensor 265 measures the voltage across the secondary winding 851 over time, and provides the measurement to the controller 260. The controller 260 determines the time-rate-of-change of the voltage (dV/dt) based on at least two voltage measurements taken at different times and compares the dV/dt to a threshold. If the dV/dt exceeds the threshold, the controller 260 causes the electrical network 857 to short the secondary winding 851.

For example, the electrical network 857 may include a transistor that shorts the secondary winding 851 when in an ON state and forms an open circuit when in an OFF state. In this example, the controller 260 generates a trigger signal in response to determining that the dV/dt exceeds the threshold and provides the trigger signal to the gate of the transistor. The trigger signal is sufficient to cause the transistor to turn ON, and the secondary winding 851 is shorted. Shorting the secondary winding 851 provides a very low impedance path for electrical current. Because the secondary winding 851 is magnetically coupled to the magnetic core 423, the secondary winding 851 draws magnetic flux out of the magnetic core 423 and reduces the impedance of the electromagnetic circuit 420 by conducting current in the secondary winding 851 and the electrical network 857.

When the contact 424b makes contact with the tap 315b, the contact 424a is still connected to the tap 315a, and the secondary winding 851 is still shorted. A voltage difference between the tap 315a and the tap 315b creates a circulating current in the electromagnetic circuit 420, and the circulating current induces a current in the secondary winding 851. Thus, the current in the electromagnetic circuit 420 and the secondary winding 851 changes (for example, increases) rapidly. The sensor 265 measures the current in the secondary winding 851 over a period of time, and provides the current data to the controller 260. The controller 260 determines the time-rate-of-change of the current (di/dt), and compares the di/dt to a threshold. A di/dt that exceeds the threshold is an indication that the contact 424a has connected to the tap 315b and that the secondary winding 851 should no longer be shorted. If the di/dt exceeds the threshold, the controller 260 provides a trigger signal to the electrical network 857 that is sufficient to form an open circuit in the electrical network such that no current flows in the secondary winding 851. Continuing with the example of the electrical network 857 including a transistor, the trigger signal is a signal that is provided to the gate of the transistor and is sufficient to cause the transistor to switch from the ON state to the OFF state. After the transistor is turned OFF, the impedance of the windings 422a, 422b increases, and the electromagnetic circuit 420 returns to steady-state operation.

Although the current control apparatus 850 does not reduce the current that flows in the contact 424b to zero (0) prior to removing the contact 424b from the tap 315a, the current control apparatus 850 still increases the lifetime of the contact 424b as compared to a conventional load tap changer that lacks the current control apparatus 850. For example, by shorting the secondary winding 851 during a switching operation when only one of the contacts 424a, 424b is connected to a tap, the current control apparatus 850 reduces the magnetic flux in the magnetic core 423 and reduces the impedance of the electromagnetic circuit 420 during the switching operation. The reduction in magnetic flux reduces the likelihood of the core 423 saturating when the contact 424b is connected to the tap 315b and thereby reduces or prevents inrush currents (or surge currents) that would otherwise occur when the contact 424b is connected to the tap 315b. By reducing or preventing inrush currents, the current control apparatus 850 prolongs the lifetime of the contact 424b and the voltage regulator 810. Further, the current control apparatus allows for the use of a high impedance electromagnetic circuit to minimize circulating current, which substantially reduces the amount of current the contacts must interrupt, especially at lower load current levels, such that the contact erosion from arcing is reduced. Moreover, the low circulating current contributes to a less inductive power factor to generally improve arc interruption. Less inductive power factor combined with the shorting of winding 851, which will reduce recovery voltage after arcing, improves the arc interrupting capability of a load tap changer.

FIG. 8B is a block diagram of an electrical network 857B. The electrical network 857B is an example implementation of the electrical network 857. The electrical network 857B includes a transistor 891 and a rectifier bridge 892 made from diodes D1-D4. The transistor 891 may be any type of transistor, for example, a metal-oxide semiconductor field-effect transistor (MOSFET) or an insulated-gate bipolar transistor (IGBT). The transistor 891 receives a trigger at a gate 893, and the trigger is sufficient to cause the transistor 891 to change state. The trigger may be received from the controller 260. When the transistor 891 is ON, current flows through the transistor 891 and the diodes D1-D4 conduct current so the secondary winding 851 is shorted. The diodes D1-D4 work in pairs, with the first pair being diodes D1 and D3, and the second pair being diodes D2 and D4. Current flow through one of the two pairs during the positive half of the cycle and the other of the two pairs during the negative half of the cycle. When the transistor is OFF, the electrical network 857B is an open circuit, and no current flows through the winding 851.

Figure 9A:
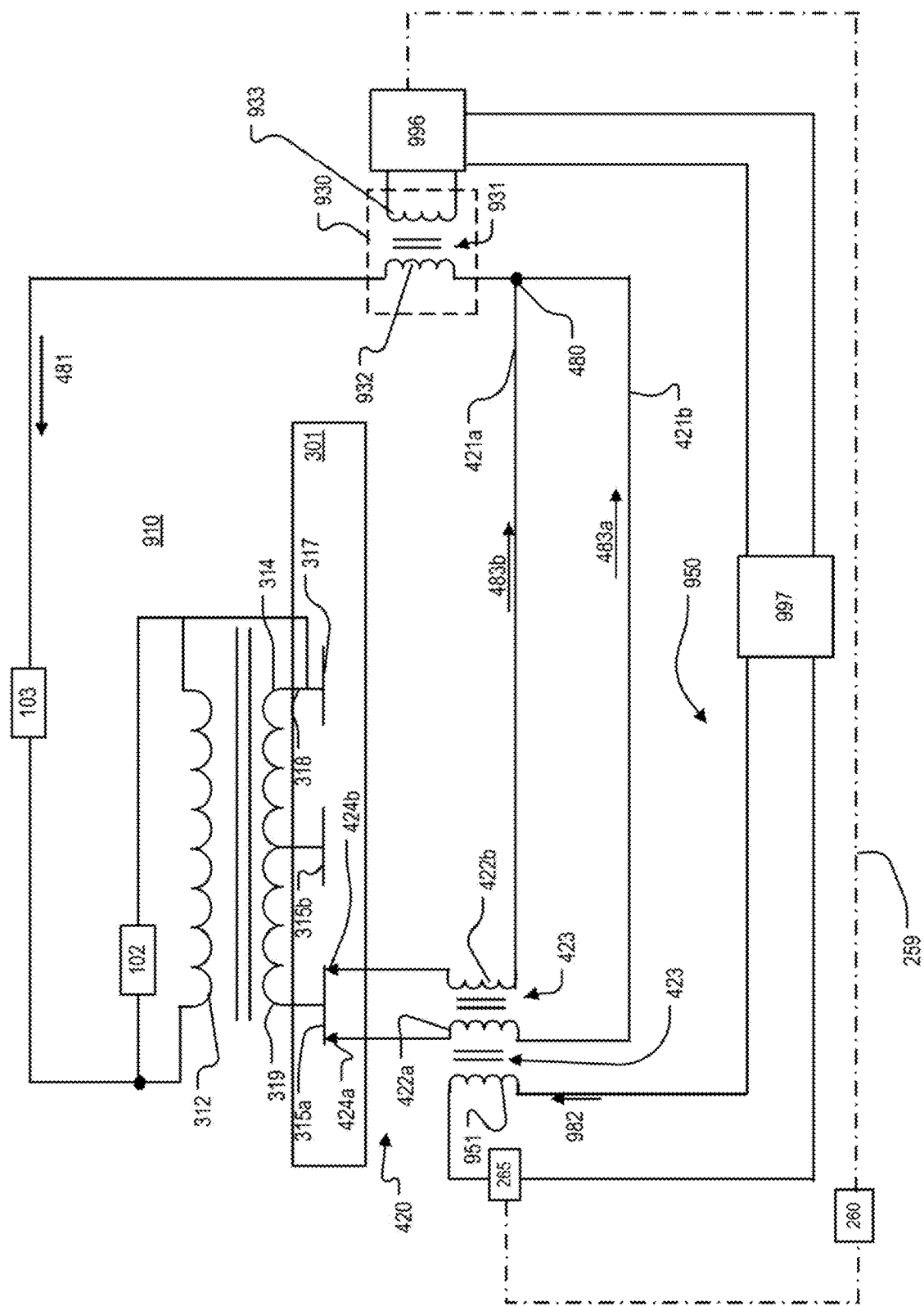
FIG. 9A is a block diagram of another example of a voltage regulator.

FIG. 9A is a block diagram of another example of a voltage regulator 910 that includes the load tap changer 301. The voltage regulator 910 may be used in the power distribution network 101 (FIG. 1A) to deliver power from the source 102 to the electrical load 103. The voltage regulator 910 includes the electromagnetic circuit 420, which electrically connects the source 102 to the node 480 and the electrical load 103 by connecting the contact 424a and/or the contact 424b to a tap on the main winding 314. A current transformer 930 is between the node 480 and the electrical load 103. The current transformer 930 includes a first current winding 932, which is electrically connected to the node 480 and the electrical load 103, and a second current winding 933. The first current winding 932 and the second current winding 933 are wrapped around a magnetic core 931. Thus, when the load current 481 flows between the node 480 and the electrical load 103 and in the first current winding 932, a corresponding time-varying current is induced in the second current winding 933.

The voltage regulator 910 also includes a current control apparatus 950, which controls the current in the electromagnetic circuit 420. The current control apparatus 950 includes an electrical network 996, a phase network 997, and a secondary coil 951. The secondary winding 951 is wrapped around the magnetic core 423, and is thus magnetically coupled to the windings 422a, 422b of the electromagnetic circuit 420. The electrical network 996 is electrically connected to the second current winding 933 and to the phase network 997. The phase network 997 is electrically connected to the secondary winding 951.

The electrical network 996 includes a shorting circuit, which may be closed (or gated on) or opened (gated off). When the shorting circuit is closed, the electrical network 996 reduces the magnetic flux in the magnetic core 931 and prevents saturation of the magnetic core 931. When the shorting circuit is open, the current that is induced in the second current winding 933 may flow through the phase network 997 to form the bias current 982. The phase network 997 is one or more electronic components arranged to form an electrical network that determines whether the bias current 982 is able to flow to the secondary winding 951 and also controls the direction that the bias current 982 flows in the secondary winding 951.

Figure 9B:
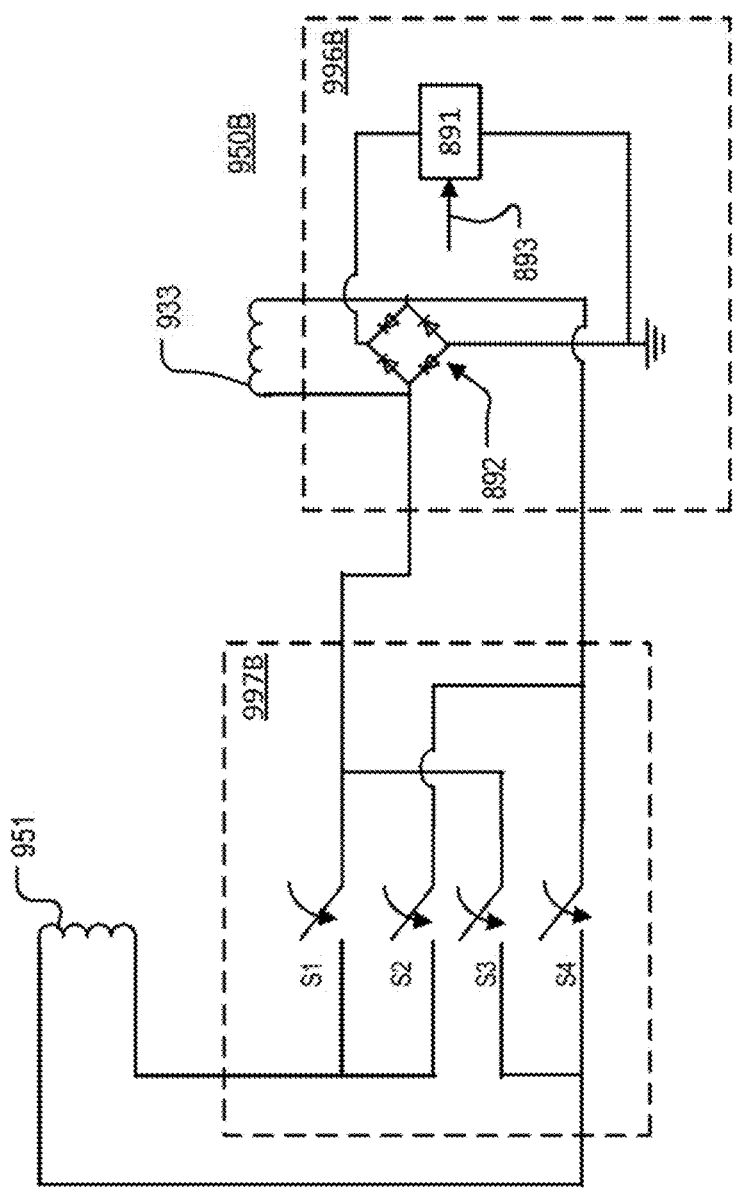
FIG. 9B is a block diagram of an example of a current control apparatus.

FIG. 9B shows a current control apparatus 950B, which is an example implementation of the current control apparatus 950. The current control apparatus 950B includes an electrical network 996B, which is implemented in the same manner as the electrical network 857B of FIG. 8B, and a phase network 997B, which is implemented as H-bridge formed from switches S1-S4. The switches S1-S4 are used to control the direction in which current flows through the secondary winding 951. When the switches S1 and S4 are closed and the switches S2 and S3 are open, current flows through the secondary winding 951 with a first phase convention, for instance zero (0) degrees. When the switches S1 and S4 are open and the switches S2 and S3 are closed, current flows through the secondary winding 951 with the opposite phase convention, for instance 180 degrees.

In steady-state operation, both of the contacts 424a, 424b make contact with one of the taps 315a, 315b. The contact 424a conducts the current 483a, and the contact 424b conducts the current 483b. Each of the currents 483a, 483b are half of the load current 481. The phase-inverting network 997 is in a configuration that does not conduct current and the bias current 982 does not flow in the secondary winding 951. For example, in implementations in which the phase-inverting network 997 is implemented as shown in FIG. 9B, all of the switches S1-S4 are open during steady-state operation. Additionally, the shorting circuit of the electrical network 996 is gated on (for example, the transistor 891 is ON) such that the current transformer 930 does not saturate or create an impedance between the tap changer 910 and the electrical load 103. The functionality of the electrical network 996B may also be realized within the phase network 997B given the proper switch topology. For instance, switching on only S1-S2 or S3-S4 will short winding 933 and leave winding 951 open.

The current control apparatus 950 is able to drive the current in either the contact 424a or the contact 424b to zero prior to a switching operation by producing the bias current 982 and controlling the direction of the bias current 982. The bias current 982 is current that is induced in the second current winding 933 and flows into the secondary winding 951 via the phase network 997. The bias current 982 induces a circulating current in windings 422a, 422b having an amplitude that is half of the amplitude of the load current 481. The bias current 982 has the same phase as the load current 481 because the bias current 982 is a current that is induced by the load current 481. Proper coordination of switches in phase network 997 causes the circulating current to cancel current through contacts 424a or 424b. In preparation for performing a tap change operation, the shorting circuit in the electrical network 996 is opened (for example, the transistor 891 is switched to an OFF state), and the phase-inverting network 997 is configured to allow the bias current 982 to flow through the secondary winding 951. The bias current 982 induces a corresponding current in the electromagnetic circuit 420. The corresponding current causes the current on the contact 424b to drop to zero, and all of the load current flows in the contact 424a. The contact 424b is then removed from the tap 315a. An arc is not formed because no current flows through the contact 424b immediately prior to separation.

After the contact 424b has separated from the tap 315a, a rapid change in voltage occurs in the electrical network 996, and the electrical network 996 is closed (for example, the transistor 891 is switched to an ON state) to prevent saturation of the magnetic cores 423 and 931. While contact 424b is transitioning from tap 315a to 315b, the electrical network 996 and phase network 997 can be coordinated to control the flux of the magnetic cores 423, 931 to zero (0) to avoid saturation. Alternatively, the electrical network 996 and phase network 997 can be coordinated to control the flux of the magnetic core 423 with an amplitude and phase to prevent saturation when contact 424b makes on tap 315b. Once the contact 424b makes on tap 315b, the electrical network 996 and phase network 997 are returned to steady state conditions.

Thus, the current control apparatus 950 mitigates arc formation when a contact separates from a tap. Additionally, the current control apparatus 950 prevents or reduces the likelihood of core saturation during switching, and thus also mitigates or prevents in-rush currents when a contact makes contact with a tap. Moreover, the current control apparatus 950 generates the bias current 982 at the correct amplitude and phase without using separate current-generation devices and without using a DC link or bus.

FIG. 10A is a block diagram of another example of a voltage regulator 1010 that includes the load tap changer 301. The voltage regulator 1010 may be used in the power distribution network 101 (FIG. 1A) to deliver power from the source 102 to the electrical load 103. The voltage regulator 1010 includes an electromagnetic circuit 1020, which electrically connects the source 102 to the node 1079 and the electrical load 103 by connecting the contact 424a and/or the contact 424b to a tap on the main winding 314. The electromagnetic circuit 1020 is the same as the electromagnetic circuit 420, except the electromagnetic circuit 1020 includes two magnetic cores 1023a and 1023b. The winding 422a is wrapped around the core 1023a, and the winding 422b is wrapped around the core 1023b. Additionally, in the voltage regulator 1010, the first electrical conductor 421a and the second electrical conductor 421b are electrically connected to an equalizer winding 1080 that is magnetically coupled to the main winding 314 and electrically connected to the electrical load 103.

The voltage regulator 1010 also includes a current control apparatus 1050 that is configured to magnetically couple to the electromagnetic circuit 1020 to control the current flow in the electromagnetic circuit 1020. The current is controlled prior to removing a contact from a tap to mitigate or prevent arcing.

The current control apparatus 1050 includes a first secondary winding 1051a, which is wrapped around the core 1023a, and a second secondary winding 1051b, which is wrapped around the core 1023b. Thus, the first secondary winding 1051a is magnetically coupled to the first winding 422a via the core 1023a, and the second secondary winding 1051b is magnetically coupled to the second winding 422b via the core 1023b. The core 1023a and the core 1023b are un-gapped magnetic cores or cores that include a smaller than usual gap.

The current control apparatus 1050 also includes an electrical network 1052 that is electrically connected to the first secondary winding 1051a and the second secondary winding 1051b. The electrical network 1052 is configured to control an amount of current that flows in and/or voltages across the first winding 422a and the second winding 422b.

FIG. 10B includes an electrical network 1052B, which is an example of an implementation of the electrical network 1052. The electrical network 1052B includes a switch 1037, which is in parallel with the first secondary winding 1051a, a switch 1038, which is in parallel with the second secondary winding 1051b, and a by-pass switch 1036, which is electrically connected to the first secondary winding 1051a and the second secondary winding 1051b. The by-pass switch 1036 is electrically connected to the switches 1037 and 1038, and the by-pass switch 1036 is positioned between the switches 1037 and 1038. The switches 1036, 1037, and 1038 may be any type of electronic component that may be controlled to permit or allow current flow. For example, the switches 1036, 1037, and 1038 may be transistors. The state of the switches 1036, 1037, 1038 may be controlled by the controller 260.

During steady-state operation, the switches 1037 and 1038 are open (such that no current flows through these switches), and the switch 1036 is closed (such that current flows through 1036). Both of the contacts 424a and 424b are on the same tap (the tap 315a in the example of FIG. 10B), and the currents 483a and 483b flow through the contacts 424a and 424b, respectively. Because the cores 1023a and 1023b are not gapped cores, there is little to no circulating current in the steady-state. Equal current flows through the contacts 424a and 424b. Thus, the currents 483a and 483b have an amplitude that is half of the amplitude of the load current 1081. Moreover, because there is no circulating current, the electromagnetic circuit 1020 and the current control apparatus 1050 have lower losses than a conventional voltage regulator with load tap changer, and the magnitude of current flowing in the contacts 424a, 424b and in the first and second electrical conductors 421a, 421b is smaller than in a conventional load tap changer. As a result, the contacts and conductors may be smaller and otherwise designed for operation at a lower than typical current.

An operation that moves the contact 424b from the tap 315a to the tap 315b is discussed as an example. The operation begins by removing the contact 424b from the tap 315a while the load current 1081 is delivered to the load. Just prior to removing the contact 424b from the tap 315a, the controller 260 provides a trigger signal to the switch 1036, a trigger signal to the switch 1037, and a trigger signal to the switch 1038. The trigger signal to the switch 1037 causes the switch 1037 to close. The trigger signals to the switches 1036 and 1038 causes the switches 1036 and 1038 to open. For example, the switches 1036, 1037, and 1038 may be transistors, and the trigger signals may be trigger signals provided to the gate of the transistor that are sufficient to cause the transistor to change state.

With the switches 1036, 1037, and 1038 configured in this manner, the first secondary winding 1051a is shorted and provides a very low impedance path for the load current 1081 through winding 422a. Because the first secondary winding 1051a is magnetically coupled to the magnetic core 1023a, the first secondary winding 1051a draws magnetic flux out of the magnetic core 1023a by conducting current in the first secondary winding 1051a. At the same time, second secondary winding 1051b is open circuited such that winding 422b becomes a high impedance path. All of the load current 1081 flows through the first contact 424a, and the contact 424b is removed from the tap 315a without forming an arc. While contact 424b is transitioning from tap 315a to 315b, switches 1036, 1037, 1038 are coordinated to control the flux in magnetic cores 1023a, 1023b to prevent saturation. After the contact 424b makes with tap 315b, switches 1037, 1038 are opened and switch 1036 is closed to complete the tap change process.

Other implementations of the electrical network 1052 are possible. For example, as shown in FIG. 10C, the electrical network 1052 may be implemented as an electrical network 1052C that includes a first AC-AC converter 1061_1 that couples the first secondary winding 1051a to the shunt winding 312 and a second AC-AC converter 1061_2 that couples the second secondary winding 1051b to the shunt winding 312. Another example implementation of the electrical network 1052 is shown in FIG. 10D. FIG. 10D includes an electrical network 1052D. The electrical network 1052D includes an AC-AC converter 1061_3 that couples the first secondary winding 1051a to the second secondary winding 1051b.

The implementations discussed, for example, in FIGS. 3A-3E, 4, 7A, 8A, and 9A have a steady state condition with both contacts (for example, contacts 324a, 324b) connected to taps such that a fixed voltage ratio exists at the voltage regulator between the voltage from the source input to the load output (for instance, the voltage across the shunt winding 312 and the voltage at node 480 of FIG. 4) such that the steady state performance is the same as conventional voltage regulator performance but with reduced losses and also with the aforementioned benefit of tap changing. In the implementations of, for example, FIG. 4 and FIG. 7A, the respective electromagnetic circuits 420, 720 cause a dependent relationship between the load currents flowing through the contacts 424a and 424b such that each contact 424a, 424b carries one half of the load current when windings 422a and 422b have an equal number of turns. Due to magnetic coupling, equal voltage exists across winding 422a and winding 422b. The effect is that the output voltage at node 480 or 779 (respectively) is the average of the voltage at contact 424a and the voltage at 424b.

An additional advantage is realized in the implementation of FIG. 10A. In particular, the implementation of FIG. 10A employs the current control apparatus 1050 to couple and decouple the windings 422a and 422b. For example, as discussed with respect to FIG. 10B, manipulation of switches 1036, 1037 and 1038 influences the current and voltage of the two windings 1051a, 1051b. Manipulating switches 1036, 1037 and 1038 at high frequencies and with controlled duty cycles influences the root-mean-square voltage at node 1079. Whereas the implementations of FIG. 4, FIG. 7A, and FIG. 9A have a fixed ratio between the input and output voltage while the contacts 424a and 424b are fixed, the implementation of FIG. 10A allows for variability of the ratio based on the control of the voltage across windings 1051a and 1051b. Whether by manipulation of switches 1036, 1037, 1038 (or an alternative configuration of the electrical network 1052), the input:output voltage ratio of the voltage regulator 1010 can be manipulated without the moving contacts 424a, 424b. Additional filter components may be added to the system to reduce harmonics in the output voltage.

The example in FIG. 10E shows another implementation of the current control apparatus 1050. In the implementation of FIG. 10E, the current control apparatus 1050 includes a winding 1053, a rectifier 1054, a DC link 1055, and an inverter 1056. The current control apparatus 1050 is electrically connected to the winding 1053, which is magnetically coupled to the shunt winding 312 via a core 1090 and draws power from the shunt winding 312. A time-varying (AC) current in the shunt winding 312 from the source 102 induces a corresponding time-varying (AC) current 1088 in the winding 1053. The implementation of the current control apparatus 1050 shown in FIG. 10E, like the current control apparatus 750 discussed with respect to FIG. 7A, is able to compensate reactive power from the power distribution network 101 in addition to having the functionality of the implementations of FIGS. 10A and 10B.

Other implementations are within the scope of the claims.

For example, FIG. 10A illustrates the electromagnetic circuit 1020 and the current control apparatus 1050 being used in the voltage regulator 1010. However, other applications and implementations are possible. For example, in the implementation shown in FIG. 11, the load tap changer 301 is removed and the electromagnetic circuit 1020 is connected directly to the main winding 314. The source 102 may be connected, for instance, in the middle of the main winding 314, either winding end 318, 319, or at any point along the main winding 314 depending on the desired output range of the voltage regulator. In the configuration shown in FIG. 11, when the electromagnetic circuit is in a neutral state, the voltage delivered to node 1079 may be the average of the voltage present at the first end 318 and second end 319 of the winding 314 which may, for example, cause the output voltage to the load 103 be equal to the output voltage from the source 102. Manipulation of the current control apparatus 1050 may, however, cause the output voltage to be increased or decreased as the voltages of windings 422a,b are controlled.

FIG. 12 is an example of applying the implementation of FIG. 11 to a distribution transformer with a primary winding 1212 and a secondary winding 1214. The distribution transformer delivers a load current 1281 to the load 103. Manipulation of the current control apparatus 1050 changes the voltages of windings 422a,b such that the effective turns ratio of the windings 1212, 1214 is adjusted and the voltage delivered to the load 103 may be regulated. Windings 1212, 1214 in FIG. 12 share a common neutral node as in a grounded-wye connection, but the principle also applies to delta-connected or otherwise isolated windings.

The rectifier, inverter and DC bus components of the implementation in FIG. 10E may be similarly implemented with the topologies in FIG. 11 and FIG. 12 to provide reactive power compensation for the power system to improve power factor. In addition to the single-phase power system applications, any of these implementations may be applied to a three-phase system. Within a three-phase application, the application may benefit from economies of scale, especially for the switching or power electronic components, where the number of switches for inverters and rectifiers per phase is reduced and the DC bus performance is thereby improved.

What is claimed is:

1. A voltage regulator comprising:
    a main magnetic core;
    a main winding comprising a plurality of taps, the main winding configured to magnetically couple to the main magnetic core;
    a first contact configured to electrically connect to one of the plurality of taps;
    a second contact configured to electrically connect to one of the plurality of taps;
    an auxiliary winding configured to magnetically couple to the main magnetic core; and
    an electrical network electrically connected to the auxiliary winding, the electrical network comprising one or more controllable power electronic components, wherein the electrical network is configured to receive reactive power from the auxiliary winding and to provide reactive power to the auxiliary winding.

2. The voltage regulator of claim 1, wherein the electrical network further comprises a first power converter.

3. The voltage regulator of claim 2, wherein the electrical network further comprises a direct current (DC) link electrically connected to the first power converter.

4. The voltage regulator of claim 3, wherein the electrical network further comprises a second power converter electrically connected to the DC link and the first power converter, and wherein the DC link is between the first power converter and the second power converter.

5. The voltage regulator of claim 4, wherein the first power converter comprises a rectifier, and the second power converter comprises an inverter.

6. The voltage regulator of claim 1, wherein the one or more controllable power electronic components comprises a plurality of transistors.

7. The voltage regulator of claim 1, further comprising:
    a second magnetic core; and
    a current control winding, wherein
    the first contact is electrically connected to a first winding,
    the second contact is electrically connected to a second winding,
    the first winding and the second winding are configured to magnetically couple to the second magnetic core,
    the current control winding is electrically connected to the electrical network and is configured to magnetically couple to the second magnetic core, and
    the electrical network is further configured to control current in one or more of the first electrical contact and the second electrical contact.

8. The voltage regulator of claim 7, wherein the electrical network is configured to prevent saturation of the second magnetic core.

9. The voltage regulator of claim 8, wherein the second magnetic core is a gapped magnetic core.

10. The voltage regulator of claim 7, wherein the electrical network is configured to control the current in the first contact such that the current in the first contact is zero during a switching operation.

11. The voltage regulator of claim 10, wherein the electrical network comprises a rectifier electrically connected to the auxiliary winding.

12. The voltage regulator of claim 11, wherein the one or more controllable power electronics comprise a plurality of transistors, and the rectifier comprises at least some of the plurality of transistors.

13. The voltage regulator of claim 11, further comprising:
    a direct current (DC) link electrically connected to the rectifier; and
    an inverter electrically connected to the DC link and the current control winding.

14. The voltage regulator of claim 1, wherein the electrical network is configured to compensate for reactive power.

15. The voltage regulator of claim 14, wherein the electrical network is configured to receive reactive power from the auxiliary winding and to provide reactive power to the auxiliary winding to thereby compensate for reactive power.

16. A controller for a voltage regulator, the controller configured to:
   receive data from a sensor that measures an electrical quantity in a current path of the voltage regulator, the current path being configured to conduct electrical current between a first switchable contact and a load of the voltage regulator; and
   control electrical current in an electrical network based on the data received from the sensor; wherein
      the electrical network and a second switchable contact are configured to be magnetically coupled by a magnetic core of the voltage regulator, and controlling the electrical current in the electrical network controls magnetic saturation of the magnetic core.

17. The controller of claim 16, wherein the controller is configured to control electrical current in the electrical network by controlling a state of at least one electronic switch in the electrical network.

18. The controller of claim 16, wherein the first and second switchable contacts comprise first and second moveable contacts.

19. A method comprising:
   electrically coupling a main winding of a voltage regulator to an alternating current (AC) electrical power distribution system;
   magnetically coupling the main winding to a first magnetic core;
   electrically connecting an electrical contact to a tap of the main winding;
   magnetically coupling an electrical network to a second magnetic core;
   magnetically coupling a first secondary winding to the second magnetic core; and
   controlling the electrical network to compensate for reactive power from the AC electrical power distribution system, wherein the first secondary winding is electrically connected to the electrical contact, and controlling the electrical network further comprises controlling an electrical current in the electrical contact.

20. The method of claim 19, further comprising controlling a state of a switch in the electrical network; and wherein
   controlling the state of the switch controls the electrical current in the electrical network to thereby control the electrical current in the electrical contact.

21. The method of claim 19, wherein controlling the electrical network to compensate for reactive power comprises controlling one or more power converters in the electrical network.

22. A voltage regulator comprising:
   a main magnetic core;
   a main winding comprising a plurality of taps, the main winding configured to magnetically couple to the main magnetic core;
   a first contact configured to electrically connect to one of the plurality of taps;
   a second contact configured to electrically connect to one of the plurality of taps;
   an auxiliary winding configured to magnetically couple to the main magnetic core; and
   an electrical network electrically connected to the auxiliary winding, the electrical network comprising one or more controllable power electronic components, wherein the one or more controllable power electronic components comprises a plurality of transistors.

23. The voltage regulator of claim 22, wherein the electrical network further comprises a power converter configured to compensate for reactive power, and the power converter comprises at least some of the plurality of transistors.

24. A voltage regulator comprising:
   a main magnetic core;
   a main winding comprising a plurality of taps, the main winding configured to magnetically couple to the main magnetic core;
   a first contact configured to electrically connect to one of the plurality of taps;
   a second contact configured to electrically connect to one of the plurality of taps;
   an auxiliary winding configured to magnetically couple to the main magnetic core; and
   an electrical network electrically connected to the auxiliary winding, the electrical network comprising:
   one or more controllable power electronic components, a first power converter configured to compensate for reactive power, a direct current (DC) link electrically connected to the first power converter, a second power converter electrically connected to the DC link and the first power converter, and wherein the DC link is between the first power converter and the second power converter.

* * * * *